(12) United States Patent
Huang et al.

(10) Patent No.: US 11,991,749 B2
(45) Date of Patent: May 21, 2024

(54) METHOD AND APPARATUS FOR RANDOM ACCESS PREAMBLE PARTITION FOR SMALL DATA TRANSMISSION IN A WIRELESS COMMUNICATION SYSTEM

(71) Applicant: ASUSTek Computer Inc., Taipei (TW)

(72) Inventors: Yi-Hsuan Huang, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 198 days.

(21) Appl. No.: 17/219,107

(22) Filed: Mar. 31, 2021

(65) Prior Publication Data
US 2021/0307073 A1  Sep. 30, 2021

Related U.S. Application Data

(60) Provisional application No. 63/015,238, filed on Apr. 24, 2020, provisional application No. 63/002,716, filed on Mar. 31, 2020.

(51) Int. Cl.
| | | |
|---|---|---|
| *H04W 74/08* | (2009.01) | |
| *H04W 74/00* | (2009.01) | |
| *H04W 74/02* | (2009.01) | |
| *H04W 74/0833* | (2024.01) | |

(52) U.S. Cl.
CPC ..... *H04W 74/0833* (2013.01); *H04W 74/008* (2013.01); *H04W 74/02* (2013.01)

(58) Field of Classification Search
CPC . H04W 74/006; H04W 74/008; H04W 74/02; H04W 74/0833
See application file for complete search history.

(56) References Cited

U.S. PATENT DOCUMENTS

| | | | | |
|---|---|---|---|---|
| 10,785,801 | B2* | 9/2020 | Li | H04W 88/023 |
| 11,166,319 | B2* | 11/2021 | Loehr | H04W 76/11 |
| 2018/0110074 | A1* | 4/2018 | Akkarakaran | H04W 72/21 |
| 2018/0110075 | A1* | 4/2018 | Ly | H04W 74/0833 |
| 2019/0059112 | A1* | 2/2019 | Ou | H04W 74/0833 |
| 2019/0075598 | A1* | 3/2019 | Li | H04W 74/0833 |
| 2019/0320467 | A1* | 10/2019 | Freda | H04W 74/004 |

(Continued)

FOREIGN PATENT DOCUMENTS

CN    110800361    2/2020

OTHER PUBLICATIONS

European Search Report from corresponding EP Application No. 21166240.8, dated Dec. 22, 2021.

(Continued)

*Primary Examiner* — Liton Miah
(74) *Attorney, Agent, or Firm* — Skaar Ulbrich Macari, P.A.

(57) ABSTRACT

A method and device are disclosed from the perspective of a User Equipment (UE). The method includes the UE receiving a configuration, from a network node, indicating that Random Access Channel (RACH) occasion(s) of a first Random Access (RA) type are not configured. The method further includes the UE determining if RACH occasion(s) of the first RA type are shared with a second RA type or a third RA type, and/or includes the UE determining the starting point of preambles for the first RA type based on at least RA parameter(s) for more than one RA type.

8 Claims, 30 Drawing Sheets

(56) References Cited

U.S. PATENT DOCUMENTS

2019/0357265 A1 11/2019 Ren et al.
2023/0030443 A1* 2/2023 Chen .................... H04W 76/27

OTHER PUBLICATIONS

Ericsson (e-mail disc rapporteur), "Phase 2 and 1 issue list" Document for: Discussion, Decision, Agenda Item: 6.13.1, Tdoc R2-2001219, 3GPP TSG-RAN WG2 #109 electronic Elbonia, Feb. 24-Mar. 6, 2020.
Samsung, "Procedure for Two-Step RACH", Document for: Discussion and Decision, Agenda Item: 7.2.1.2, R1-2000606, 3GPP TSG RAN WG1 Meeting #100e, e-Meeting, Feb. 24-Mar. 6, 2020.
Notice of Submission of Opinion from Korean Intellectual Property Office in corresponding KR 10-2021-0041899, dated Mar. 9, 2023.
Ericsson (e-mail disc rapporteur), "Phase 2 and 1 issue list", Discussion, Decision, Agenda Item: 6.13.1, R2-2001219, 3GPP TSG-RAN WG2 #109 electronic Elbonia, Feb. 24-Mar. 6, 2020.
ZTE, Sanechips, "New WID on small data transmission for NR", Information, Agenda Item: 8, RP-191074, 3GPP TSG RAN Meeting #84, Newport Beach, USA, Jun. 3-6, 2019.
Office Action to the corresponding Korean Patent Application rendered by the Korean Intellectual Property Office (KIPO) dated Sep. 22, 2023, 10 pages (including English translation).
ZTE (email discussion Moderator), RP-192572, Work Item on NR small data transmissions in Inactive state, 3GPP TSG RAN Meeting #86, Date of publication on 3GPP server (Dec. 2, 2019), 4 pages.

* cited by examiner

1st IE (e.g. PRACH-Config)

1st parameter (e.g. PRACH-ParametersCE)

2nd parameter (e.g. edt-PRACH-ParametersCE)

FIG. 5

2nd IE (e.g. RACH-ConfigCommon)

4th IE (e.g. RACH-ConfigGeneric)

1st group of parameters for ROs

3rd IE (e.g. RACH-ConfigCommonTwoStepRA)

5th IE (e.g. RACH-ConfigGenericTwoStepRA)

2nd group of parameters for ROs

FIG. 6

2nd IE (e.g. RACH-ConfigCommon)
- 4th IE (e.g. RACH-ConfigGeneric)
  - 1st group of parameters for ROs
- 6th IE (for 4-step SDT)
  - 3rd group of parameters for ROs 3rd IE (e.g. RACH-ConfigCommonTwoStepRA)
- 5th IE (e.g. RACH-ConfigGenericTwoStepRA)
  - 2nd group of parameters for ROs
- 7th IE (for 2-step SDT)
  - 4th group of parameters for ROs

FIG. 7

| Example number | RA configurations on a BWP | | The preamble starting point of | |
|---|---|---|---|---|
| | RA without small data | RA with small data | 4-step SDT | 2-step SDT |
| 1 | Both 4-step and 2-step | 4-step (without 2-step) | $2^{nd}$ parameter + $5^{th}$ parameter | N/A |
| 2 | | 2-step (without 4-step) | N/A | $2^{nd}$ parameter + $5^{th}$ parameter |
| 3a | | Both 4-step and 2-step | $2^{nd}$ parameter + $5^{th}$ parameter | $2^{nd}$ parameter + $5^{th}$ parameter + $9^{th}$ parameter (or $9^{th}$ parameter + 1) |
| 3b | | | $2^{nd}$ parameter + $5^{th}$ parameter + $10^{th}$ parameter (or $10^{th}$ parameter + 1) | $2^{nd}$ parameter + $5^{th}$ parameter |
| 3c | | | $2^{nd}$ parameter | $2^{nd}$ parameter + $9^{th}$ parameter (or $9^{th}$ parameter + 1) |
| 3d | | | $2^{nd}$ parameter + $10^{th}$ parameter (or $10^{th}$ parameter + 1) | $2^{nd}$ parameter |
| 3e | | | $2^{nd}$ parameter | $2^{nd}$ parameter + $9^{th}$ parameter + $5^{th}$ parameter (or $9^{th}$ parameter + 1 + $5^{th}$ parameter) |
| 3f | | | $2^{nd}$ parameter + $10^{th}$ parameter + $5^{th}$ parameter (or $10^{th}$ parameter + 1 + $5^{th}$ parameter) | $2^{nd}$ parameter |
| 4 | 4-step (without 2-step) | 4-step (without 2-step) | $2^{nd}$ parameter | N/A |
| 5 | | 2-step (without 4-step) | N/A | $2^{nd}$ parameter |
| 6a | | Both 4-step and 2-step | $2^{nd}$ parameter | $2^{nd}$ parameter + $9^{th}$ parameter (or $9^{th}$ parameter + 1) |
| 6b | | | $2^{nd}$ parameter + $10^{th}$ parameter (or $10^{th}$ parameter + 1) | $2^{nd}$ parameter |

FIG. 23

METHOD AND APPARATUS FOR RANDOM ACCESS PREAMBLE PARTITION FOR SMALL DATA TRANSMISSION IN A WIRELESS COMMUNICATION SYSTEM

CROSS-REFERENCE TO RELATED APPLICATIONS

The present application claims the benefit of U.S. Provisional Patent Application Ser. No. 63/002,716 filed on Mar. 31, 2020 and U.S. Provisional Patent Application Ser. No. 63/015,238 filed on Apr. 24, 2020, the entire disclosures of which are incorporated herein in their entirety by reference.

FIELD

This disclosure generally relates to wireless communication networks, and more particularly, to a method and apparatus for random access preamble partition for small data transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a User Equipment (UE). The method includes the UE receiving a configuration, from a network node, indicating that Random Access Channel (RACH) occasion(s) of a first Random Access (RA) type are not configured. The method further includes the UE determining if RACH occasion(s) of the first RA type are shared with a second RA type or a third RA type, and/or includes the UE determining the starting point of preambles for the first RA type based on at least RA parameter(s) for more than one RA type.

BRIEF DESCRIPTION OF THE DRAWINGS

FIG. 5 illustrates an example of Random Access Channel Occasion(s) (RO(s)) configurations in New RAT/Radio according to one exemplary embodiment.

FIG. 6 illustrates an example of RO configuration(s) according to one exemplary embodiment.

FIG. 7 illustrates an example of RO configuration case 1 (NR with Small Data Transmission (SDT)) according to one exemplary embodiment.

FIG. 23 illustrates a table showing examples of preamble starting points for SDT with shared RO(s) according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: 36.300 V15.8.0, "E-UTRA and E-UTRAN; Overall description; Stage 2"; RP-193252, "Work Item on NR small data transmissions in INACTIVE state", ZTE Corporation; TS 36.331 V15.8.0, "E-UTRA, Radio Resource Control (RRC) protocol specification"; TS 38.331 V15.8.0, "NR, Radio Resource Control (RRC) protocol specification"; RP-193238, "New SID on support of reduced capability NR devices", Ericsson; TS 36.321 V15.8.0, "E-UTRA; Medium Access Control (MAC) protocol specification"; R2-2002379, "Introduction of 2-step RACH in 38.321", ZTE Corporation and Sanechips; and R2-2002380, "Introduction of 2-step RA", Ericsson. The standards and documents listed above are hereby expressly incorporated by reference in their entirety.

Figure 1:
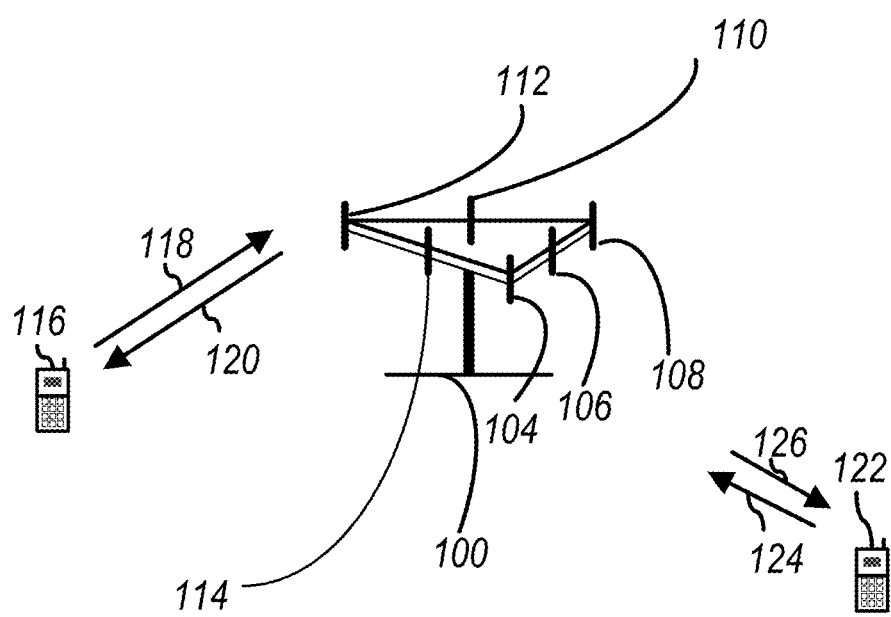
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
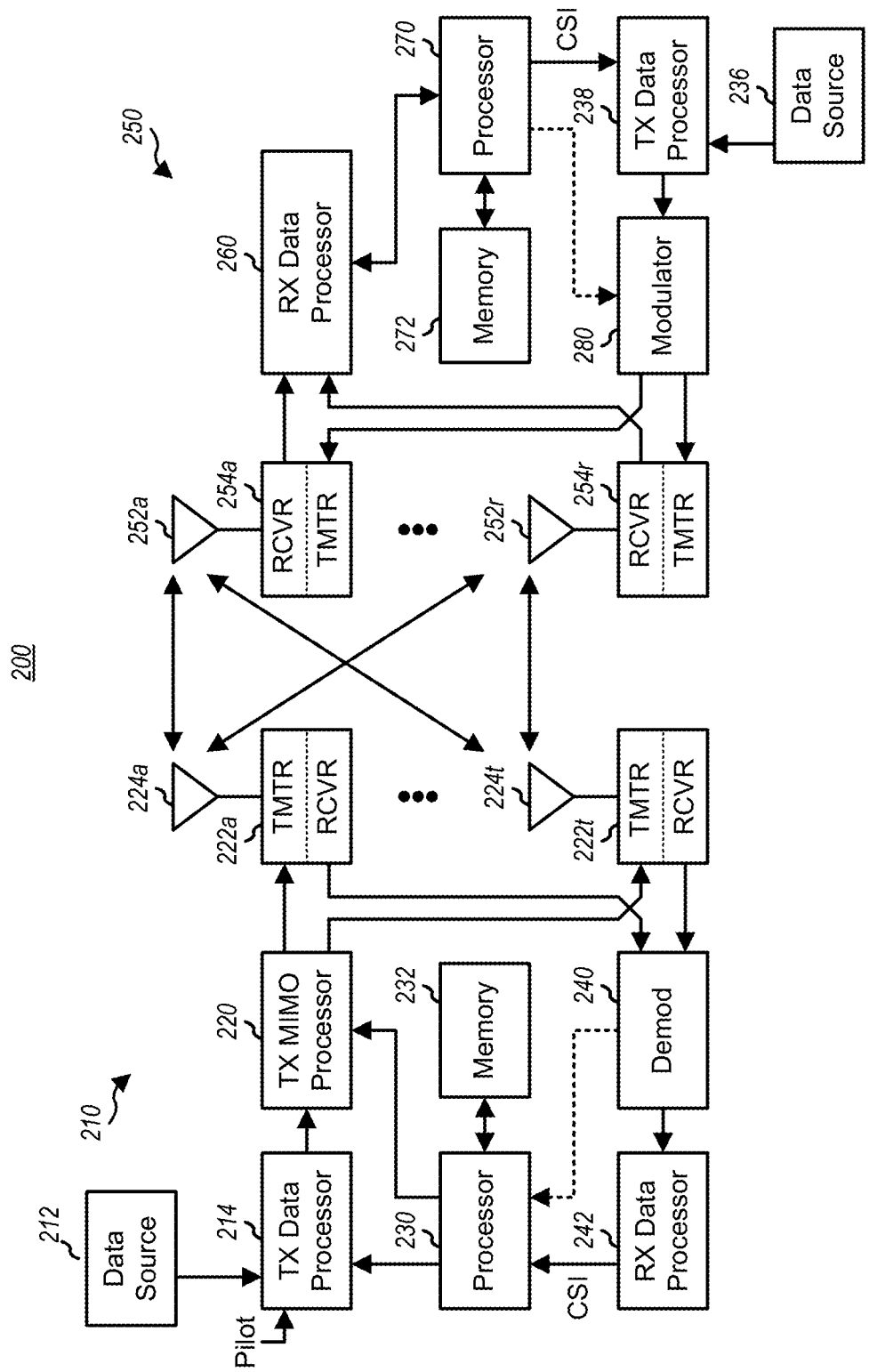
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
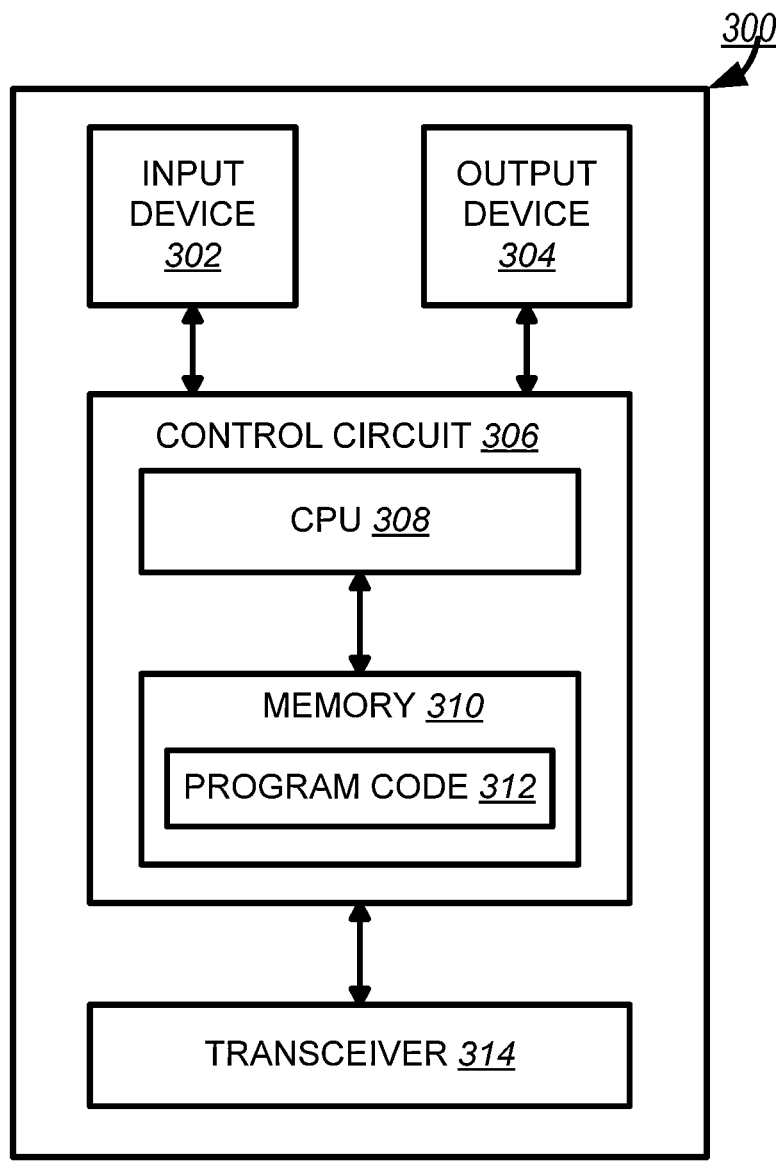
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
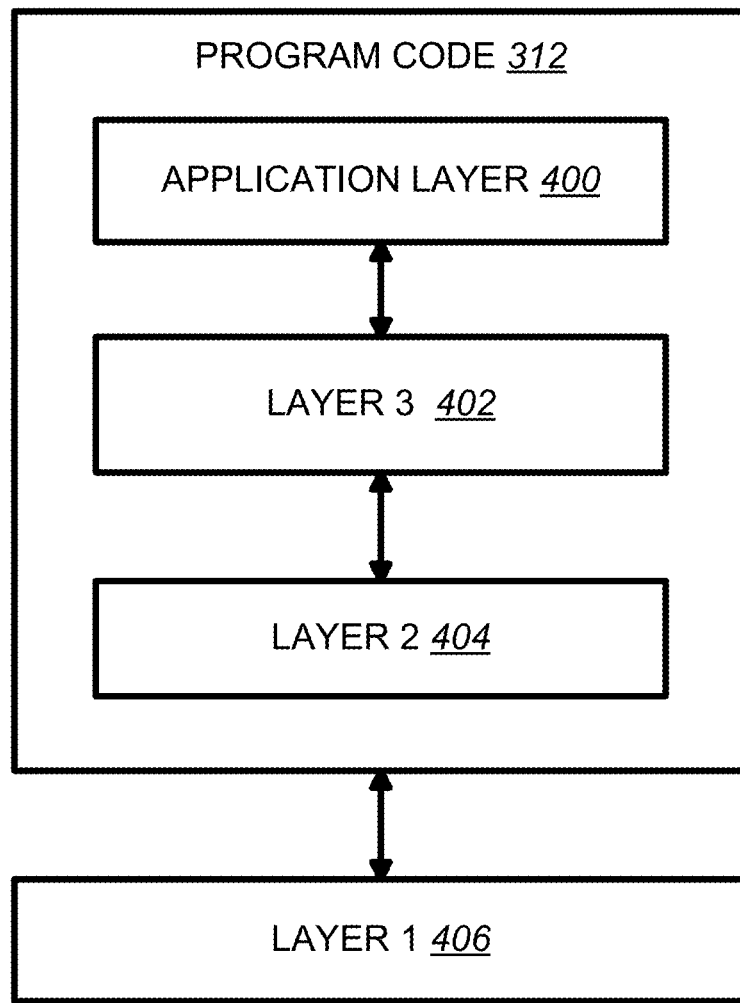
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

The general description of early data transmission (EDT) in RRC_IDLE state is specified in 3GPP TS 36.300 as follows:

7.3b EDT
7.3b.1 General

EDT allows one uplink data transmission optionally followed by one downlink data transmission during the random access procedure.

EDT is triggered when the upper layers have requested the establishment or resumption of the RRC Connection for Mobile Originated data (i.e., not signalling or SMS) and the uplink data size is less than or equal to a TB size indicated in the system information. EDT is not used for data over the control plane when using the User Plane CIoT EPS optimizations.

EDT is only applicable to BL UEs, UEs in Enhanced Coverage and NB-IoT UEs.

The work item of small data transmission in NR has been approved in RAN plenary #86 meeting. The description of the work item is specified in 3GPP RP-193252 as follows:

3 Justification

NR supports RRC_INACTIVE state and UEs with infrequent (periodic and/or non-periodic) data transmission are generally maintained by the network in the RRC_INACTIVE state. Until Rel-16, the RRC_INACTIVE state doesn't support data transmission. Hence, the UE has to resume the connection (i.e. move to RRC_CONNECTED state) for any DL (MT) and UL (MO) data. Connection setup and subsequently release to INACTIVE state happens for each data transmission however small and infrequent the data packets are. This results in unnecessary power consumption and signalling overhead.

Specific examples of small and infrequent data traffic include the following use cases:

Smartphone applications:
Traffic from Instant Messaging services (whatsapp, QQ, wechat etc)
Heart-beat/keep-alive traffic from IM/email clients and other apps
Push notifications from various applications Non-smartphone applications:
Traffic from wearables (periodic positioning information etc)
sensors (Industrial Wireless Sensor Networks transmitting temperature, pressure readings periodically or in an event triggered manner etc)
smart meters and smart meter networks sending periodic meter readings As noted in 3GPP TS 22.891, the NR system shall:
be efficient and flexible for low throughput short data bursts
support efficient signalling mechanisms (e.g. signalling is less than payload)
reduce signalling overhead in general Signalling overhead from INACTIVE state UEs for small data packets is a general problem and will become a critical issue with more UEs in NR not only for network performance and efficiency but also for the UE battery performance. In general, any device that has intermittent small data packets in INACTIVE state will benefit from enabling small data transmission in INACTIVE.

The key enablers for small data transmission in NR, namely the INACTIVE state, 2-step, 4-step RACH and configured grant type-1 have already been specified as part of Rel-15 and Rel-16. So, this work builds on these building blocks to enable small data transmission in INACTIVE state for NR.

4 Objective
4.1 Objective of SI or Core Part WI or Testing Part WI

This work item enables small data transmission in RRC_INACTIVE state as follows:

For the RRC_INACTIVE state:
- UL small data transmissions for RACH-based schemes (i.e. 2-step and 4-step RACH):
  - General procedure to enable UP data transmission for small data packets from INACTIVE state (e.g. using MSGA or MSG3) [RAN2]
  - Enable flexible payload sizes larger than the Rel-16 CCCH message size that is possible currently for INACTIVE state for MSGA and MSG3 to support UP data transmission in UL (actual payload size can be up to network configuration) [RAN2]
  - Context fetch and data forwarding (with and without anchor relocation) in INACTIVE state for RACH-based solutions [RAN2, RAN3]
  - Note 1: The security aspects of the above solutions should be checked with SA3
- Transmission of UL data on pre-configured PUSCH resources (i.e. reusing the configured grant type 1)—when TA is valid
  - General procedure for small data transmission over configured grant type 1 resources from INACTIVE state [RAN2]
  - Configuration of the configured grant type1 resources for small data transmission in UL for INACTIVE state [RAN2]

No new RRC state should be introduced in this WID. Transmission of small data in UL, subsequent transmission of small data in UL and DL and the state transition decisions should be under network control.

In LTE, the RACH Occasion's (RO) configurations for Random Access (RA) with and without EDT could be provided by Radio Resource Control (RRC), as specified in 3GPP TS 36.331 as below:

PRACH-Config

The IE PRACH-ConfigSIB and IE PRACH-Config are used to specify the PRACH configuration in the system information and in the mobility control information, respectively.

| PRACH-Config information elements | |
|---|---|
| -- ASN1START | |
| PRACH-ConfigSIB ::= | SEQUENCE { |
|   rootSequenceIndex | INTEGER (0..837) , |
|   prach-ConfigInfo | PRACH-ConfigInfo |
| } | |
| PRACH-ConfigSIB-v1310 ::= | SEQUENCE { |
|   rsrp-ThresholdsPrachInfoList-r13 | RSRP-ThresholdsPrachInfoList-r13, |
|   mpdcch-startSF-CSS-RA-r13 | CHOICE { |
|     fdd-r13 | ENUMERATED {v1, v1dot5, v2, v2dot5, v4, v5, v8, v10}, |
|     tdd-r13 | ENUMERATED {v1, v2, v4, v5, v8, v10, v20, spare} |
|   } | OPTIONAL, -- Cond MP |
|   prach-HoppingOffset-r13 | INTEGER (0..94)      OPTIONAL, -- Need OR |
|   prach-ParametersListCE-r13 | PRACH-ParametersListCE-r13 |
| } | |
| PRACH-ConfigSIB-v1530 ::= | SEQUENCE { |
|   edt-PRACH-ParametersListCE-r15 | SEQUENCE (SIZE(1..maxCE-Level-r13)) OF EDT-PRACH-ParametersCE-r15 |
| } | |
| PRACH-Config ::= | SEQUENCE { |
|   rootSequenceIndex | INTEGER (0..837), |
|   prach-ConfigInfo | PRACH-ConfigInfo      OPTIONAL -- Need ON |
| } | |
| PRACH-Config-v1310 ::= | SEQUENCE { |
|   rsrp-ThresholdsPrachInfoList-r13 | RSRP-ThresholdsPrachInfoList-r13      OPTIONAL, -- Cond MP |
|   mpdcch-startSF-CSS-RA-r13 | CHOICE { |
|     fdd-r13 | ENUMERATED {v1, v1dot5, v2, v2dot5, v4, v5, v8, v10}, |
|     tdd-r13 | ENUMERATED { v1, v2, v4, v5, v8, v10, v20, spare} |
|   } | OPTIONAL, -- Cond MP |
|   prach-HoppingOffset-r13 | INTEGER (0..94)      OPTIONAL, -- Need OR |
|   prach-ParametersListCE-r13 | PRACH-ParametersListCE-r13      OPTIONAL, -- Cond MP |
|   initial-CE-level-r13 | INTEGER (0..3)      OPTIONAL, -- Need OR |
| } | |
| PRACH-Config-v1430 ::= | SEQUENCE { |
|   rootSequenceIndexHighSpeed-r14 | INTEGER (0..837), |
|   zeroCorrelationZoneConfigHighSpeed-r14 | INTEGER (0..12), |
|   prach-ConfigIndexHighSpeed-r14 | INTEGER (0..63), |
|   prach-FreqOffsetHighSpeed-r14 | INTEGER (0..94), |
| } | |

-continued

| PRACH-Config information elements |
|---|

```
PRACH-ConfigSCell-r10 ::=       SEQUENCE {
  prach-ConfigIndex-r10           INTEGER (0..63)
}
PRACH-ConfigInfo ::=            SEQUENCE {
  prach-ConfigIndex               INTGER (0..63),
  highSpeedFlag                   BOOLEAN,
  zeroCorrelatonZoneConfig        INTEGER (0..15),
  prach-FreqOffset                INTEGER (0..94)
}
PRACH-ParametersListCE-r13 ::= SEQUENCE (SIZE(1..maxCE-Level-r-13)) OF PRACH-ParametersCE-r13
PRACH-ParametersCE-r-13 ::=     SEQUENCE {
  prach-ConfigIndex-r13           INTEGER (0..63),
  prach-FreqOffset-r13              INTEGER (0..94),
  prach-StartingSubframe-r13      ENUMERATED {sf2, sf4, sf8, sf16, sf32, sf64, sf128,
                                              sf256}           OPTIONAL, -- Need OP
  maxNumPreambleAttemptCE-r13
                                  ENUMERATED {n3, n4, n5, n6, n7, n8, n10}    OPTIONAL, -- Need OP
  numRepetitionPerPreambleAttempt-r13   ENUMERATED { n1,n2,n4,n8,n16,n32,n64,n128}
  mpdcch-NarrowbandsToMonitor-r13    SEQUENCE (SIZE (1..2)) OF
                                                INTEGER (1..maxAvailNarrowBands-r13),
  mpdcch-NumRepetition-RA-r13     ENUMERATED { r1, r2, r4, r8, r16,
                                                r32, r64, r128, r256},
  prach-HoppingConfig-r13         ENUMERATED {on,off}
}
EDT-PRACH-ParametersCE-r15 :=   SEQUENCE {
  edt-PRACH-ParametersCE-r15      SEQUENCE {
    prach-ConfigIndex-r15           INTEGER (0..63),
    prach-FreqOffset-r15              INTEGER (0..94),
    prach-StartingSubframe-r15      ENUMERATED { sf2, sf4, sf8, sf16, sf32, sf64, sf128,
sf256}    OPTIONAL, -- Need OP
    mpdcch-NarrowbandsToMonitor-r15   SEQUENCE (SIZE (1..2)) OF INTEGER
(1..maxAvailNarrowBands-r13)
  } OPTIONAL -- Need OR
}
RSRP-ThresholdsPrachInfoList-r13 ::= SEQUENCE (SIZE (1..3)) OF RSRP-Range
-- ASN1STOP
```

| PRACH-Config field descriptions |
|---| edt-PRACH-ParametersListCE
Configures PRACH parameters for each CE level applicable to a UE performing EDT. If included, the number of entries is same as number of entries in prach-ParametersListCE. The first entry in the list is the PRACH parameters for CE level 0, the second entry in the list is the PRACH parameters for CE level 1, and so on. The parameters maxNumPreambleAttemptCE, numRepetitionPerPreambleAttempt, mpdcch-NumRepetition-RA, prach-HoppingConfig included in prach-ParametersListCE for CE level X are also applicable for EDT.
initial-CE-level
Indicates initial PRACH CE level at random access, see TS 36.321 [6]. If not configured, UE selects PRACH CE level based on measured RSRP level, see TS 36.321 [6].
prach-ConfigIndex
Parameter: prach-ConfigurationIndex, see TS 36.211 [21], clause 5.7.1.
PRACH-Config field descriptions
prach-ParametersListCE
Configures PRACH parameters for each CE level. The first entry in the list is the PRACH parameters of CE level 0, the second entry in the list is the PRACH parameters of CE level 1, and so on.
prach-StartingSubframe
PRACH starting subframe periodicity, expressed in number of subframes available for preamble transmission (PRACH opportunities), see TS 36.211 [21]. Value sf2 corresponds to 2 subframes, sf4 corresponds to 4 subframes and so on. EUTRAN configures the PRACH starting subframe periodicity larger than or equal to the number of PRACH repetitions per attempt for each CE level (numRepetitionPerPreambleAttempt).
If the field is absent, the value is determined implicitly in TS 36.211 [21], clause 5.7.1.
rsrp-ThresholdsPrachInfoList
The criterion for BL UEs and UEs in CE to select PRACH resource set. Up to 3 RSRP threshold values are signalled to determine the CE level for PRACH, see TS 36.213 [23]. The first element corresponds to RSRP threshold 1, the second element corresponds to RSRP threshold 2 and so on, see TS 36.321 [6]. The UE shall ignore this field if only one CE level, i.e. CE level 0, is

| PRACH-Config field descriptions |
| --- |
| configured in prach-ParametersListCE. The number of RSRP thresholds present in rsrp-ThresholdsPrachInfoList is equal to the number of CE levels configured in prach-ParametersListCE minus one.<br>A UE that supports powerClass-14 dBm shall correct the RSRP threshold values before applying them as follows:<br>RSRP threshold = Signalled RSRP threshold − min{0, (14 − min(23, P-Max))} where P-Max is the value of p-Max field in SystemInformationBlockType1-BR. |

In NR, the RO's configurations for 4-step and 2-step RA and parameter configurations to indicate the RA preamble could be provided by RRC, as specified in 3GPP TS 38.331 as follows:

RACH-ConfigCommon

The IE RACH-ConfigCommon is used to specify the cell specific random-access parameters.

| RACH-ConfigCommon information element |
| --- |
| ```
-- ASN1START
-- TAG-RACH-CONFIGCOMMON-START
RACH-ConfigCommon : :=                  SEQUENCE {
    rach-ConfigGeneric                  RACH-ConfigGeneric,
    totalNumberOfRA-Preambles           INTEGER (1..63)                                   OPTIONAL, -- Need S
    ssb-perRACH-OccasionAndCB-PreamblesPerSSB   CHOICE {
        oneEighth                       ENUMERATED {n4,n8,n12,n16,n20,n24,n28,n32,n36,n40,n44,n48,n52,n56,n60,n64},
        oneFourth                       ENUMERATED {n4,n8,n12,n16,n20,n24,n28,n32,n36,n40,n44,n48,n52,n56,n60,n64},
        oneHalf                         ENUMERATED {n4,n8,n12, n16,n20,n24,n28,n32,n36,n40,n44,n48,n52,n56,n60,n64},
        one                             ENUMERATED {n4,n8,n12,n16,n20,n24,n28,n32,n36,n40,n44,n48,n52,n56,n60,n64},
        two                             ENUMERATED {n4, n8, n12, n16, n20, n24, n28, n32},
        four                            INTEGER (1..16),
        eight                           INTEGER (1..8),
        sixteen                         INTEGER (1..4)
    }                                                                                     OPTIONAL, -- Need M
    groupBconfigured                    SEQUENCE {
        ra-Msg3SizeGroupA               ENUMERATED {b56, b144, b208, b256, b282, b480, b640,
                                                    b800, b1000, b72, spare6, spare5, spare4, spare3, spare2, spare1},
        messagePowerOffsetGroupB        ENUMERATED { minusinfinity, dB0, dB5, dB8, dB10, dB12, dB15, dB18},
        numberOfRA-PreamblesGroupA      INTEGER (1..64)
    }                                                                                     OPTIONAL, -- Need R
    <...>
    prach-RootSequenceIndex             CHOICE {
        l839                                INTEGER (0..837),
        l139                                INTEGER (0..137)
    },
    msg1-SubcarrierSpacing              SubcarrierSpacing                                 OPTIONAL, -- Cond L139
    restrictedSetConfig                 ENUMERATED {unrestrictedSet, restrictedSetTypeA, restrictedSetTypeB},
    msg3-transformPrecoder              ENUMERATED {enabled}                              OPTIONAL, -- Need R
    ...,
    [[
    ra-PrioritizationForAccessIdentity  SEQUENCE {
        ra-Prioritization-r16               RA-Prioritization,
        ra-PrioritizationForAI-r16          BIT STRING (SIZE (2))
    }                                                                                     OPTIONAL, -- Need R
    prach-RootSequenceIndex-r16         CHOICE {
        l571                                INTEGER (0..569),
        l1151                               INTEGER (0..1149)
    }   OPTIONAL --Need R
    ]]
}
-- TAG-RACH-CONFIGCOMMON-STOP
-- ASN1STOP
``` |

| RACH-ConfigCommon field descriptions |
|---|
| messagePowerOffsetGroupB
Threshold for preamble selection. Value is in dB. Value minusinfinity corresponds to -infinity. Value dB0 corresponds to 0 dB, dB5 corresponds to 5 dB and so on. (see TS 38.321 [3], clause 5.1.2)
numberOfRA-PreamblesGroupA
The number of CB preambles per SSB in group A. This determines implicitly the number of CB preambles per SSB available in group B. (see TS 38.321 [3], clause 5.1.1). The setting should be consistent with the setting of ssb-perRACH-OccasionAndCB-PreamblesPerSSB.
rach-ConfigGeneric
RACH parameters for both regular random access and beam failure recovery.
ssb-perRACH-OccasionAndCB-PreamblesPerSSB
The meaning of this field is twofold: the CHOICE conveys the information about the number of SSBs per RACH occasion. Value oneEight corresponds to one SSB associated with 8 RACH occasions, value oneFourth corresponds to one SSB associated with 4 RACH occasions, and so on. The ENUMERATED part indicates the number of Contention Based preambles per SSB. Value n4 corresponds to 4 Contention Based preambles per SSB, value n8 corresponds to 8 Contention Based preambles per SSB, and so on. The total number of CB preambles in a RACH occasion is given by CB-preambles-per-SSB * max(1, SSB-per-rach-occasion). See TS 38.213 [13].
totalNumberOfRA-Preambles
Total number of preambles used for contention based and contention free random access in the RACH resources defined in RACH-ConfigCommon, excluding preambles used for other purposes (e.g. for SI request). If the field is absent, all 64 preambles are available for RA. The setting should
be consistent with the setting of ssb-perRACH-OccasionAndCB-PreamblesPerSSB, i.e. it should be a multiple of the number of SSBs per RACH occasion. |

25

RACH-ConfigCommonTwoStepRA
The IE RACH-ConfigCommonTwoStepRA is used to specify cell specific 2-step random-access type parameters.

| RACH-ConfigCommonTwoStepRA information element |
|---|
| ```
-- ASN1START
-- TAG-RACH-CONFIGCOMMONTWOSTEPRA-START
RACH-ConfigCommonTwoStepRA-r16 ::=                          SEQUENCE {
    rach-ConfigGenericTwoStepRA-r16                             RACH-ConfigCommonTwoStepRA-r16,
    msgA-TotalNumberOfRA-Preambles-r16                          INTEGER(1..63)
OPTIONAL, -- Need S
    msgA-SSB-PerRACH-OccasionAndCB-PreamblesPerSSB-r16          CHOICE {
        oneEighth                                                   ENUMERATED
{n4,n8,n12,n16,n20,n24,n28,n32,n36,n40,n44,n48,n52,n56,n60,n64},
        oneFourth                                                   ENUMERATED
{n4,n8,n12,n16,n20,n24,n28,n32,n36,n40,n44,n48,n52,n56,n60,n64},
        oneHalf                                                     ENUMERATED
{n4,n8,n12,n16,n20,n24,n28,n32,n36,n40,n44,n48,n52,n56,n60,n64},
        one                                                         ENUMERATED
{n4,n8,n12,n16,n20,n24,n28,n32,n36,n40,n44,n48,n52,n56,n60,n64},
        two                                                         ENUMERATED
{n4,n8,n12,n16,n20,n24,n28,n32},
        four                                                        INTEGER (1..16),
        eight                                                       INTEGER (1..8),
        sixteen                                                     INTEGER (1..4)
    }
OPTIONAL, -- Cond 2StepOnly
    msgA-CB-PreamblesPerSSB-PerSharedRO-r16                     INTEGER (1..60)
OPTIONAL, -- Cond SharedRO
    msgA-SSB-SharedRO-MaskIndex-r16                             INTEGER (1..15)
OPTIONAL, -- Need S
    groupB-ConfiguredTwoStepRA-r16                              GroupB-ConfiguredTwoStepRA-r16
OPTIONAL, -- Need S
    msgA-PRACH-Root SequenceIndex-r16                           CHOICE {
        1839                                                        INTEGER (0..837),
        1139                                                        INTEGER (0..137)
    }
OPTIONAL, -- Cond 2StepOnly
    <...>
    msgA-SubcarrierSpacing-r16                                  SubcarrierSpacing
OPTIONAL, -- Cond 2StepOnlyL139
    msgA-RestrictedSetConfig-r16                                ENUMERATED {unrestrictedSet,
restrictedSetTypeA,
                                                                               restrictedSetTypeB}
OPTIONAL, -- Cond 2StepOnly
    <...>
}
``` |

-continued

| RACH-ConfigCommonTwoStepRA information element | |
|---|---|
| GroupB-ConfiguredTwoStepRA-r16 : := | SEQUENCE { |
| ra-MsgA-SizeGroupA | ENUMERATED {b56, b144, b208, b256, b282, |
| b480, b640, b800, | |
| | b1000, b72, spare6, spare5, |
| spare4, spare3, spare2, spare1} OPTIONAL, -- Need M | |
| messagePowerOffsetGroupB | ENUMERATED {minusinfinity, dB0, dB5, |
| dB8, dB10, dB12, dB15, dB18} OPTIONAL, -- Need M | |
| numberofRA-PreamblesGroupA | INTEGER (1..64) |
| } | |
| -- TAG-RACH-CONFIGCOMMONTWOSTEPRA-STOP | |
| -- ASN1STOP | |

RACH-ConfigCommonTwoStepRA field descriptions groupB-ConfiguredTwoStepRA
Preamble grouping for 2-step random access type. If the field is absent then there is only one preamble group configured and only one msgA PUSCH configuration.
msgA-CB-PreamblesPerSSB-PerSharedRO
Number of contention-based preambles used for 2-step RA type from the non-CBRA 4-step type preambles associated with each SSB for RO shared with 4-step type RA. The number of preambles for 2-step RA type shall not exceed the number of preambles per SSB minus the number of contention-based preambles per SSB for 4-step type RA. The possible value range for this parameter needs to be aligned with value range for the configured SSBs per RACH occasion in SSB-perRACH-OccasionAndCB-PreamblesPerSSB in RACH-ConfigCommon. The field is only applicable for the case of shared ROs with 4-step type random access.
msgA-SSB-PerRACH-OccasionAndCB-PreamblesPerSSB
The meaning of this field is twofold: the CHOICE conveys the information about the number of SSBs per RACH occasion. Value oneEight corresponds to one SSB associated with 8 RACH occasions, value oneFourth corresponds to one SSB associated with 4 RACH occasions, and so on. The ENUMERATED part indicates the number of Contention Based preambles per SSB. Value n4 corresponds to 4 Contention Based preambles per SSB, value n8 corresponds to 8 Contention Based preambles per SSB, and so on. The total number of CB preambles in a RACH occasion is given by CB-preambles-per-SSB * max(1, SSB-per-rach-occasion). If the field is not configured and both 2-step and 4-step are configured for the BWP, the UE applies the value in the field ssb-perRACH-OccasionAndCB-PreamblesPerSSB in RACH-ConfigCommon.
msgA-SSB-SharedRO-MaskIndex
Indicates the subset of 4-step type ROs shared with 2-step random access type for each SSB. This field is configured when there is more than one RO per SSB. If the field is absent, and 4-step and 2-step has shared ROs, then all ROs are shared.
msgA-TotalNumberOfRA-Preambles
Indicates the total number of preambles used for contention-based and contention-free 2-step random access type when ROs for 2-step are not shared with 4-step. If the field is absent, and 2-step and 4-step does not have shared ROs, all 64 preambles are available for 2-step random access type.
rach-ConfigGenericTwoStepRA
2-step random access type parameters for both regular random access and beam failure recovery.

GroupB-ConfiguredTwoStepRA field descriptions messagePowerOffsetGroupB
Threshold for preamble selection. Value is in dB. Value minusinfinity corresponds to -infinity.
Value dB0 corresponds to 0 dB, dB5 corresponds to 5 dB and so on. (see TS 38.321 [3], clause
5.1.1). Absent if only one preamble group is configured.
numberofRA-PreamblesGroupA
The number of CB preambles per SSB in group A for idle/inactive or connected mode. The setting
of the number of preambles for each group should be consistent with ssb-perRACH-
OccasionAndCB-PreamblesPerSSB-TwoStepRA or msgA-CB-PreamblesPerSSB if configured.
ra-MsgA-SizeGroupA
Transport block size threshold in bits below which the UE shall use a contention-based RA
preamble of group A. (see TS 38.321 [3], clause 5.1.1). Absent if only one preamble group is configured.

| Conditional Presence | Explanation |
| --- | --- |
| 2StepOnlyL139 | The field is mandatory present if prach-RootSequenceIndex L = 139 and no 4-step random access type is configured, otherwise the field is absent, Need S. |
| 2StepSUL | The field is mandatory present in initialUplinkBWP in supplementaryUplink when both 2-step and 4-step RA type is configured; otherwise, the field is absent. |
| 2StepOnly | The field is mandatory present if there are no 4-step random access configurations configured in the BWP, i.e only 2-step random access type configured in the BWP, otherwise the field is Need S. |
| SharedRO | The field is mandatory present if the 2-step random access type occasions are shared with 4-step random access type, otherwise the field is not present. |

RACH-ConfigGeneric

The IE RACH-ConfigGeneric is used to specify the random-access parameters both for regular random access as well as for beam failure recovery.

RACH-ConfigGeneric information element

```
-- ASN1START
-- TAG-RACH-CONFIGGENERIC-START
RACH-ConfigGeneric ::=              SEQUENCE {
    prach-ConfigurationIndex            INTEGER (0..255),
    msg1-FDM                            ENUMERATED {one, two, four, eight},
    msg1-FrequencyStart                 INTEGER (0..maxNrofPhysicalResourceBlocks-1),
    zeroCorrelationZoneConfig           INTEGER (0..15),
    preambleReceivedTargetPower         INTEGER (-202..-60),
    preambleTransMax                    ENUMERATED {n3, n4, n5, n6, n7, n8, n10, n20, n50, n100, n200},
    powerRampingStep                    ENUMERATED {dB0, dB2, dB4, dB6},
    ra-ResponseWindow                   ENUMERATED {sl1, sl2, sl4, sl8, sl10, sl20, sl40, sl80},
    ...,
    [[
    ra-ResponseWindow-r16               ENUMERATED {sl1, sl2, sl4, sl8, sl10, sl20, sl40, sl60, sl80, sl160} OPTIONAL, -- Need R
    prach-ConfigurationIndex-v16xy      INTEGER (256..262) OPTIONAL -- Need R
    ]]
}
-- TAG-RACH-CONFIGGENERIC-STOP
-- ASN1STOP
```

RACH-ConfigGeneric field descriptions prach-ConfigurationIndex

PRACH configuration index. For prach-ConfigurationIndex configured under beamFailureRecovery-Config, the prach-ConfigurationIndex can only correspond to the short preamble format, (see TS 38.211 [16], clause 6.3.3.2). If the field prach-ConfigurationIndex-v16xy is present, the UE shall ignore the value provided in prach-ConfigurationIndex (without suffix).

preambleTransMax

Max number of RA preamble transmission performed before declaring a failure (see TS 38.321 [3], clauses 5.1.4, 5.1.5).

ra-ResponseWindow

Msg2 (RAR) window length in number of slots. The network configures a value lower than or equal to 10 ms when Msg2 is transmitted with licensed spectrum channel access and 40 ms when Msg2 is transmitted with shared spectrum channel access (see TS 38.321 [3], clause 5.1.4). UE ignores the field if included in SCellConfig. If ra-ResponseWindow-r16 is signalled, UE shall ignore the ra-ResponseWindow (without suffix).

RACH-ConfigGenericTwoStepRA
The IE RACH-ConfigGenericTwoStepRA is used to specify the 2-step random access type parameters.

| RACH-ConfigGenericTwoStepRA information element |
| --- |

```
-- ASN1START
-- TAG-RACH-CONFIGGENERICTWOSTEPRA-START
RACH-ConfigGenericTwoStepRA-r16 ::=       SEQUENCE {
    msgA-PRACH-ConfigurationIndex-r16          INTEGER (0..262)
OPTIONAL, -- Cond 2StepOnly
    msgA-RO-FDM-r16                            ENUMERATED {one, two, four, eight}
OPTIONAL, -- Cond 2StepOnly
    msgA-RO-FrequencyStart-r16                 INTEGER (0..maxNrofPhysicalResourceBlocks-1)
OPTIONAL, -- Cond 2StepOnly
    msgA-ZeroCorrelationZoneConfig-r16         INTEGER (0..15)
OPTIONAL, -- Cond 2StepOnly
    msgA-PreamblePowerRampingStep-r16          ENUMERATED { dB0, dB2, dB4, dB6}
OPTIONAL, -- Cond 2StepOnly
    msgA-PreambleReceivedTargetPower-r16       INTEGER (-202..-60)
OPTIONAL, -- Cond 2StepOnly
    msgB-ResponseWindow-r16                    ENUMERATED {sl1, s12, s14, s18, sl10, s120, s140,
s180, sl160, s1320},
    preambleTransMax-r16                       ENUMERATED {n3, n4, n5, n6, n7, n8, n10, n20, n50,
n100, n200},
    msgA-TransMax-r16                          ENUMERATED {n1, n2, n4, n6, n8, n10, n20, n50, n100,
n200} OPTIONAL, -- Need R
    ...
}
-- TAG-RACH-CONFIGGENERICTWOSTEPRA-STOP
-- ASN1STOP
```

| RACH-ConfigGenericTwoStepRA field descriptions |
| --- | msgA-PRACH-ConfigurationIndex
Cell-specific PRACH configuration index for 2-step RA type. If the field is absent the UE shall use the value of corresponding 4-step random access parameter in the configured BWP. If the value is in the range of 256 to 262, the field prach-ConfigurationIndex-v16xy should be considered configured (see TS 38.211 [16], clause 6.3.3.2). This field may only be present if no 4-step type RA is configured in the BWP or in the case of separate ROs with 4-step type RA.
msgA-RO-FDM
The number of msgA PRACH transmission occasions Frequency-Division Multiplexed in one time instance. If the field is absent, UE shall use value of msg1-FDM in RACH-ConfigGeneric in the configured BWP (see TS 38.211 [16], clause 6.3.3.2). This field may only be present if no 4-step type RA is configured in the BWP or in the case of separate ROs with 4-step type RA.
msgA-RO-FrequencyStart
Offset of lowest PRACH transmissions occasion in frequency domain with respect to PRB 0. If the field is absent, UE shall use value of msg1-FrequencyStart in RACH-ConfigGeneric in the configured BWP (see TS 38.211 [16], clauses 5.3.2 and 6.3.3.2). This field may only be present if no 4-step type RA is configured in the BWP or in the case of separate ROs with 4-step type RA.
msgA-TransMax
Max number of MsgA preamble transmissions performed before switching to 4-step random access (see TS 38.321 [3], clauses 5.1.1). This field may only be applicable in case of 2-step and 4-step RA type are configured or switching to 4-step type RA is not supported.
msgA-ZeroCorrelationZoneConfig
N-CS configuration for msgA preamble, see Table 6.3.3.1-5 in TS 38.211 [16]. If the field is absent, UE shall use value zeroCorrelationZoneConfig in RACH-ConfigGeneric in the configured BWP. This field may only be present if no 4-step type RA is configured in the BWP or in the case of separate ROs with 4-step type RA.
msgB-ResponseWindow
MsgB monitoring window length in number of slots. The network configures a value lower than or equal to 40 ms (see TS 38.321 [3], clause 5.1.1).
preamble TransMax
Max number of RA preamble transmission performed before declaring a failure (see TS 38.321 [3], clauses 5.1.4, 5.1.5).

| Conditional Presence | Explanation |
| --- | --- |
| 2StepOnly | The field is mandatory present if there are no 4-step random access configurations configured in the BWP, i.e only 2-step random access type configured in the BWP, otherwise the field is Need S |

In LTE, the RA preamble selection for EDT is specified in 3GPP TS 36.321 as follows:
5.1 Random Access Procedure
5.1.1 Random Access Procedure Initialization
[ . . . ]
The following information for related Serving Cell is assumed to be available before the procedure can be initiated for NB-IoT UEs, BL UEs or UEs in enhanced coverage, as specified in TS 36.331 [8]:
  if the UE is a BL UE or a UE in enhanced coverage:
    the available set of PRACH resources associated with each enhanced coverage level supported in the Serving Cell for the transmission of the Random Access Preamble, prach-ConfigIndex.
    for EDT, the available set of PRACH resources associated with EDT for each enhanced coverage level supported in the Serving Cell for the transmission of the Random Access Preamble, prach-ConfigIndex.

[ . . . ]
  for EDT, the preambles that are contained in Random Access Preamble groups for each enhanced coverage level, if it exists, are the preambles firstPreamble to edt-LastPreamble if PRACH resources configured by edt-PRACH-ParametersCE are different from the PRACH resources configured by PRACH-ParametersCE for all enhanced coverage levels and edt-PRACH-ParametersCE for all other enhanced coverage levels, otherwise the preambles for EDT are the preambles lastPreamble+1 to edt-LastPreamble.

In addition, the parameter configurations to indicate the RA preamble could be provided by RRC, as specified in 3GPP TS 36.331 as follows:
RACH-ConfigCommon
The IE RACH-ConfigCommon is used to specify the generic random access parameters.

RACH-ConfigCommon

```
-- ASN1START
RACH-ConfigCommon ::=        SEQUENCE {
    preambleInfo                         SEQUENCE {
        numberOfRA-Preambles                 ENUMERATED {
                                                 n4, n8, n12, n16, n20, n24, n28,
                                                 n32, n36, n40, n44, n48, n52, n56,
                                                 n60, n64},
        preamblesGroupAConfig                SEQUENCE {
            sizeOfRA-PreamblesGroupA             ENUMERATED {
                                                     n4, n8, n12, n16, n20, n24, n28,
                                                     n32, n36, n40, n44, n48, n52, n56,
                                                     n60},
            messageSizeGroupA                    ENUMERATED {b56, b144, b208, b256},
            messagePowerOffsetGroupB             ENUMERATED {
                                                     minusinfinity, dB0, dB5, dB8, dB10, dB12,
                                                     dB15, dB18},
            ...
        } OPTIONAL                                                                    -- Need OP
    },
    <...>
    [[ preambleTransMax-CE-r13            PreambleTransMax                OPTIONAL, -- Need
OR
       rach-CE-LevelInfoList-r13          RACH-CE-LevelInfoList-r13 OPTIONAL        OPTIONAL -- Need
OR
    ]],
    <...>
RACH-CE-LevelInfoList-r13 ::=    SEQUENCE (SIZE (1..maxCE-Level-r13) ) OF RACH-CE-LevelInfo-r13
RACH-CE-LevelInfo-r13 ::=        SEQUENCE {
    preambleMappingInfo-r13              SEQUENCE {
        firstPreamble-r13                    INTEGER (0..63),
        lastPreamble-r13                     INTEGER (0..63)
    },
    [...]
    [[ edt-Parameters-r15                SEQUENCE {
        edt-LastPreamble-r15                 INTEGER (0..63),
        edt-SmallTBS-Enabled-r15             BOOLEAN,
        edt-TBS-r15                          ENUMERATED {b328, b408, b504, b600, b712,
                                                 b808, b936, b1000or456},
        mac-ContentionResolutionTimer-r15    ENUMERATED {sf240, sf480, sf960,
                                                 sf1920, sf3840, sf5760, sf7680, sf10240}
    OPTIONAL -- Need OP
    } OPTIONAL              -- Cond EDT
    ]]
}
[...]
-- ASN1STOP
```

[ ... ]

edt-LastPreamble
Provides the mapping of preambles to groups for each CE level for EDT, as specified in TS 36.321 [6]. For the concerned CE level, if PRACH resources configured by edt-PRACH-ParametersCE-r15 are different from the PRACH resources configured by PRACH-ParametersCE-r13 for all CE levels and edt-PRACH-ParametersCE-r15 for all other CE levels, the preambles for EDT are the preambles firstPreamble-r13 to edt-LastPreamble-r15, otherwise the preambles for EDT are the preambles lastPreamble-r13 +1 to edt-LastPreamble-r15.
numberOfRA-Preambles
Number of non-dedicated random access preambles in TS 36.321 [6]. Value is an integer. Value n4 corresponds to 4, n8 corresponds to 8 and so on.
preambleMappingInfo
Provides the mapping of preambles to groups for each CE level, except for EDT, as specified in TS 36.321 [6]. When random access preambles group B is used, firstPreamble-r13 is set to 0 and lastPreamble-r13 is set to numberOfRA-Preambles-1.
preamblesGroupAConfig
Provides the configuration for preamble grouping in TS 36.321 [6]. If the field is not signalled, the size of the random access preambles group A, as specified in TS 36.321 [6], is equal to numberOfRA-Preambles.
preambleTransMax, preambleTransMax-CE
Maximum number of preamble transmission in TS 36.321 [6]. Value is an integer. Value n3 corresponds to 3, n4 corresponds to 4 and so on.
rach-CE-LevelInfoList
Provides RACH information for each coverage level. The first entry in the list contains RACH information of CE level 0, the second entry in the list contains RACH information of CE level 1, and so on. If E-UTRAN includes rach-CE-LevelInfoList, it includes the same number of entries as in prach-ParametersListCE.

[ ... ]

| Conditional presence | Explanation |
|---|---|
| EDT | The field is mandatory present if cp-EDT or up-EDT in SystemInformationBlockType2 is present; otherwise the field is not present and the UE shall delete any existing value for this field. |
| EDT-OR | The field is optionally present, Need OR, if cp-EDT or up-EDT in SystemInformationBlockType2 is present; otherwise the field is not present and the UE shall delete any existing value for this field. |

In NR, the parameters to indicate the 4-step and 2-step RA preamble are specified in the CR of 3GPP TS 38.321 (3GPP R2-2002379) as follows:

5.1 Random Access Procedure
5.1.1 Random Access Procedure Initialization
[ ... ]
RRC configures the following parameters for the Random Access procedure:
[ ... ]
ra-PreambleIndex: Random Access Preamble;
ra-ssb-OccasionMaskIndex: defines PRACH occasion(s) associated with an SSB in which the MAC entity may transmit a Random Access Preamble (see clause 7.4);
msgA-SSB-SharedRO-MaskIndex: Indicates the subset of 4-step RA type random access ROs shared with 2-step RA type ROs for each SSB. If 2-step RA type ROs are shared with 4-step RA type ROs and msgA-SSB-SharedRO-MaskIndex is not configured, then all 4-step RA type ROs are available for 2-step RA type (see clause 7.4);
ra-OccasionList: defines PRACH occasion(s) associated with a CSI-RS in which the MAC entity may transmit a Random Access Preamble;
ra-PreambleStartIndex: the starting index of Random Access Preamble(s) for on-demand SI request;
preambleTransMax: the maximum number of Random Access Preamble transmission;
ssb-perRACH-OccasionAndCB-PreamblesPerSSB: defines the number of SSBs mapped to each PRACH occasion for 4-step RA type and the number of contention-based Random Access Preambles mapped to each SSB;
msgA-SSB-PerRACH-OccasionAndCB-PreamblesPerSSB: defines the number of SSBs mapped to each PRACH occasion for 2-step RA type and the number of contention-based Random Access Preambles mapped to each SSB;
if groupBconfigured is configured, then Random Access Preambles group B is configured for 4-step RA type.
Amongst the contention-based Random Access Preambles for 4-step RA type associated with an SSB (as defined in TS 38.213 [6]), the first numberOfRA-PreamblesGroupA Random Access Preambles belong to Random Access Preambles group A. The remaining Random Access Preambles associated with the SSB belong to Random Access Preambles group B (if configured).
if groupB-ConfiguredTwoStepRA is configured, then Random Access Preambles group B is configured for 2-step RA type.
Amongst the contention-based Random Access Preambles for 2-step RA type associated with an SSB (as defined in TS 38.213 [6]), the first msgA-numberOfRA-PreamblesGroupA Random Access Preambles belong to Random Access Preambles group A. The remaining Random Access Preambles associated with the SSB belong to Random Access Preambles group B (if configured).

NOTE 2: If Random Access Preambles group B is supported by the cell, Random Access Preambles group B is included for each SSB.

if Random Access Preambles group B is configured for 4-step RA type:
  ra-Msg3SizeGroupA: the threshold to determine the groups of Random Access Preambles for 4-step RA type;
  msg3-DeltaPreamble: $\Delta_{PREAMBLE\_Msg3}$ in TS 38.213 [6];
  messagePowerOffsetGroupB: the power offset for preamble selection;
  numberOfRA-PreamblesGroupA: defines the number of Random Access Preambles in Random Access Preamble group A for each SSB.

if Random Access Preambles group B is configured for 2-step RA type:
  msgA-DeltaPreamble: $\Delta_{PREAMBLE\_MsgA}$ in TS 38.213 [6];
  msgA-messagePowerOffsetGroupB: the power offset for preamble selection configured as messagePowerOffsetGroupB included in GroupB-ConfiguredTwoStepRA;
  msgA-numberOfRA-PreamblesGroupA: defines the number of Random Access Preambles in Random Access Preamble group A for each SSB configured as numberofRA-PreamblesGroupA in GroupB-ConfiguredTwoStepRA.
  ra-MsgASizeGroupA: the threshold to determine the groups of Random Access Preambles for 2-step RA type;

the set of Random Access Preambles and/or PRACH occasions for SI request, if any;

the set of Random Access Preambles and/or PRACH occasions for beam failure recovery request, if any;

the set of Random Access Preambles and/or PRACH occasions for reconfiguration with sync, if any;

[ . . . ]

When the Random Access procedure is initiated on a Serving Cell, the MAC entity shall:

[ . . . ]

1> if random access procedure is initiated by PDCCH order and if the ra-PreambleIndex explicitly provided by PDCCH is not 0b000000; or 1> if the Random Access procedure was initiated for SI request (as specified in TS 38.331 [5]) and the Random Access Resources for SI request have been explicitly provided by RRC; or 1> if the Random Access procedure was initiated for beam failure recovery (as specified in clause 5.17) and if the contention-free Random Access Resources for beam failure recovery request for 4-step RA type have been explicitly provided by RRC for the BWP selected for random access procedure; or 1> if the Random Access procedure was initiated for reconfiguration with sync and if the contention-free Random Access Resources for 4-step RA type have been explicitly provided in rach-ConfigDedicated for the BWP selected for random access:
  2> set the RA_TYPE to 4-stepRA;

1> else if the BWP selected for random access procedure is configured with both 2-step and 4-step RA type random access resources and the RSRP of the downlink pathloss reference is above RSRP_THRESHOLD_RA_TYPE_SELECTION; or 1> if the BWP selected for random access procedure is only configured with 2-step RA type random access resources (i.e. no 4-step RACH RA type resources configured); or 1> if the Random Access procedure was initiated for reconfiguration with sync and if the contention-free Random Access Resources for 2-step RA type have been explicitly provided in rach-ConfigDedicated for the BWP selected for random access:
  2> set the RA_TYPE to 2-stepRA;

1> else:
  2> set the RA_TYPE to 4-stepRA;

1> perform initialization of variables specific to random access type as specified in sub-clause 5.1.1a;

1> if RA_TYPE is set to 2-stepRA:
  2> perform the random access resource selection procedure for 2-step RA type (see clause 5.1.2a);

1> else:
  2> perform the Random Access Resource selection procedure (see clause 5.1.2).

In LTE, a UE can transmit user data in RRC_IDLE state via a random access (RA) procedure for early data transmission (EDT). The early data transmission can be triggered when the upper layers have requested the establishment or resumption of the RRC connection, as discussed in 3GPP TS 36.300.

In NR, small data transmission in RRC_INACTIVE state is to be studied to reduce power consumption and signalling overhead without establishing a RRC connection and subsequently release, as discussed in 3GPP RP-193252. To enable small data transmission in RRC_INACTIVE state, RACH-based method and/or pre-configured PUSCH resources based method are currently considered. The RACH-based method may include 4-step and/or 2-step RA. When some Uplink (UL) data (e.g. small data) is available for transmission while the UE is in RRC_INACTIVE state, the UE may initiate a RRC Resume procedure in RRC_INACTIVE state which triggers a RA procedure for the small data transmission.

For 4-step RA (e.g. with small data), the UE may select RA resources and then send a RA preamble (Msg1). The RA resources may include RA preamble, SS/PBCH block (SSB), Channel State Information Reference Signal (CSI-RS) and/or Random Access Channel (RACH) occasion. The NW may receive the Msg1 and send a RAR (Msg2). In response to receiving the Msg2, the UE may use the UL grant in the Msg2 to transmit a Msg3 which may contain RRC resume request and the small data. In response to receiving the Msg3, the NW may send a Msg4 to inform the UE to complete the RA procedure and transmit a RRC release message to keep the UE in the RRC_INACTIVE state.

For 2-step RA (e.g. with small data), the UE may select RA resources and then send a MSGA including a RA preamble and a Physical Uplink Shared Channel (PUSCH) payload. The RA resources may include RA preamble, SSB, CSI-RS, RACH occasion(s), and/or PUSCH occasion(s). The PUSCH payload may contain RRC resume request and the small data. In response to receiving the MSGA, the NW may send a MSGB to inform the UE to complete the RA procedure and may transmit a RRC release message to keep the UE in the RRC_INACTIVE state. If the NW receives a RA preamble but fails to receive a PUSCH payload, the NW may send a MSGB to inform the UE to fall back to Msg3. The UE may use the UL grant in the MSGB to transmit a Msg3. The Msg3 may contain RRC resume request and the small data. In response to receiving the Msg3, the NW may send a Msg4 to inform the UE to complete the RA procedure and may transmit a RRC release message to keep the UE in the RRC_INACTIVE state.

During a RA procedure in LTE, the configuration to indicate RACH occasion(s) (RO(s)) is provided by RRC on each coverage enhancement level, as specified in 3GPP TS 36.331. There is a first IE (e.g. PRACH-Config) to specify the PRACH configuration. In the first IE, there is a list of first parameters (e.g. PRACH-ParametersCE) for RA without EDT and a list of second parameters (e.g. edt-PRACH-ParametersCE) for RA with EDT (as shown in FIG. 5, which shows an example of RO configuration(s) in LTE). The parameters under the first parameter (e.g. prach-ConfigIndex, prach-FreqOffset, prach-StartingSubframe) and the second parameter (e.g. prach-ConfigIndex, prach-FreqOffset, prach-StartingSubframe) indicate the RO(s), including configuration index and/or frequency offset of PRACH. If the RO(s) for RA with EDT (i.e. the RO(s) indicated by the second parameter) are not configured, the RA with EDT uses the RO(s) for RA without EDT (i.e. the RO(s) indicated by the first parameter). The RA with EDT is considered to share the RO(s) with the RA without EDT.

During a RA procedure in NR, the configuration to indicate RO(s) is provided by RRC on each Bandwidth Part (BWP), as discussed in 3GPP TS 38.331. There is a second IE (e.g. RACH-ConfigCommon) for 4-step RA configuration and a third IE (e.g. RACH-ConfigCornrnonTwoStepRA) for 2-step RA configuration. There is a fourth IE (e.g. RACH-ConfigGeneric) in the second IE and a fifth IE (e.g. RACH-ConfigGenericTwoStepRA) in the third IE to specify the RA parameters including RO(s) configuration (as shown in FIG. 6, which shows an example of RO configuration(s) in NR). There is a first group of parameters (e.g. prach-ConfigurationIndex, msg1-FDM, msg1-FrequencyStart) in the fourth IE and a second group of parameters (e.g. msgA-PRACH-ConfigurationIndex, msgA-RO-FDM, msgA-RO-FrequencyStart) in the fifth IE to indicate the RO(s), including configuration index and/or frequency offset of PRACH. If the RO(s) for 2-step RA (i.e. the RO(s) indicated by the fifth IE) are not configured, the 2-step RA uses the RO(s) for 4-step RA (i.e. the RO(s) indicated by the fourth IE). The 2-step RA is considered to share the RO(s) with 4-step RA.

To enable RACH-based small data transmission in NR, RO configurations for normal RA (e.g. not used for small data transmission) and SDT RA (e.g. used for small data transmission) may be needed. If both 2-step RA and 4-step RA are supported, RO configurations for 2-step RA and 4-step RA may be needed.

For EDT in LTE, if the RO(s) for RA with early data are not configured, the RA with early data may use the RO(s) for RA without early data. In NR, if the RO(s) for 4-step RA with small data are not configured, the 4-step RA with small data may use the RO(s) for 4-step RA without small data. The 4-step RA with small data is considered to share the RO(s) with the 4-step RA without small data. If the RO(s) for 2-step RA with small data are not configured, the 2-step RA with small data may use the RO(s) for 2-step RA without small data. The 2-step RA with small data is considered to share the RO(s) with the 2-step RA without small data.

For example, during the RA procedure for small data transmission in NR, two groups of parameters may be needed to indicate the RO(s) (as showed in FIG. 7, which shows an example of RO configuration case 1 (NR with Small Data Transmission (SDT)). In the second IE (e.g. RACH-ConfigCommon), there may be a sixth IE containing a third group of parameters for 4-step RA with small data. In the third IE (e.g. RACH-ConfigCommonTwoStepRA), there may be a seventh IE containing a fourth group of parameters for 2-step RA with small data. If the RO(s) for 4-step RA with small data (i.e. the RO(s) indicated by the sixth IE) are not configured, the 4-step RA with small data may use the RO(s) for 4-step RA without small data (i.e. the RO(s) indicated by the fourth IE). If the RO(s) for 2-step RA with small data (i.e. the RO(s) indicated by the seventh IE) are not configured, the 2-step RA with small data may use the RO(s) for 2-step RA without small data (i.e. the RO(s) indicated by the fifth IE).

Considering small data transmission in NR, various RA types may coexist, and the possible RA types may include normal 4-step (or may be called 4-step non-SDT), normal 2-step (or may be called 2-step non-SDT), 4-step SDT, and 2-step SDT. However, based on the configuration of indicating supported RA types and RO(s) of the supported RA types (as shown in FIG. 7, which shows an example of RO configuration case 1 (NR with SDT)) there exists some ambiguity for some cases on whether a RA type shares RO(s) with another RA type. The ambiguity may cause different understanding between UE and NW, which resulting in inaccurate or inefficient resource usage.

It is possible that 4-step normal RA (may be always) has its own RO(s), and other RA types could have its own RO(s) or shares RO(s) with other RA type based on the configuration. Among the (eight) cases that can be indicated based on the configuration as shown in FIG. 7, there may be three ambiguous cases in indicating the shared RO(s). The configuration examples are discussed below.

Case 1: Normal 4-Step and 4-Step SDT have Own RO(s); Normal 2-Step and 2-Step SDT do not have Own RO(s)

The RO(s) in the fourth IE (e.g. RACH-ConfigGeneric) may be configured. The RO(s) in the sixth IE may be configured. The RO(s) in the fifth IE (e.g. RACH-ConfigGenericTwoStepRA) may not be configured. The RO(s) in the seventh IE may not be configured. The configuration may cause the following ambiguity (e.g. same configuration may cause different interpretations).

As an example, in a first interpretation, normal 2-step may use the RO(s) of normal 4-step and the 2-step SDT may use the RO(s) of normal 2-step. The normal 2-step may use the RO(s) in the fourth IE (e.g. RACH-ConfigGeneric). The 2-step SDT may use the RO(s) in the fourth IE (e.g. RACH-ConfigGeneric).

As an example, in a second interpretation, normal 2-step may use the RO(s) of normal 4-step and the 2-step SDT may use the RO(s) of 4-step SDT. The normal 2-step may use the RO(s) in the fourth IE (e.g. RACH-ConfigGeneric). The 2-step SDT may use the RO(s) in the sixth IE. However, following the logic mentioned above, if the RO(s) indicated by the seventh IE are not configured, the 2-step SDT may use the RO(s) of normal 2-step, indicated by the fifth IE (e.g. RACH-ConfigGenericTwoStepRA).

As an example, in a third interpretation, normal 2-step may use the RO(s) of 4-step SDT and the 2-step SDT may use the RO(s) of normal 2-step. The normal 2-step may use the RO(s) in the sixth IE. The 2-step SDT may use the RO(s) in the sixth IE. However, following the logic mentioned above, if the RO(s) indicated by the fifth IE (e.g. RACH-ConfigGenericTwoStepRA) are not configured, the normal 2-step may use the RO(s) of normal 4-step, indicated by the fourth IE (e.g. RACH-ConfigGeneric).

To solve the ambiguity, one alternative could be to define (or hard-code) one specific interpretation (e.g. of the above interpretations) in case the network provides (or the UE receives) a configuration such that the RA type of normal 2-step RA and the RA type of 2-step SDT do not have their own RO(s) (while the RA type of normal 4-step and the RA type of 4-step SDT may have their own RO). For example, if the UE receives such configuration, the UE could determine the RO(s) of a specific RA type according to the first (or second, or third) interpretation.

Case 2: Normal 4-Step, 4-Step SDT and Normal 2-Step have Own RO(s); 2-Step SDT does not have Own RO(s)

The RO(s) in the fourth IE (e.g. RACH-ConfigGeneric) may be configured. The RO(s) in the sixth IE may be configured. The RO(s) in the fifth IE (e.g. RACH-ConfigGenericTwoStepRA) may be configured. The RO(s) in the seventh IE may not be configured. The configuration may cause the following ambiguity (e.g. same configuration may cause different interpretations).

As an example, in a first interpretation, 2-step SDT may use the RO(s) of normal 2-step. The 2-step SDT may use the RO(s) in the fifth IE (e.g. RACH-ConfigGenericTwoStepRA). The RO(s) in the seventh IE may not be configured.

As an example, in a second interpretation, 2-step SDT may use the RO(s) of 4-step SDT. The 2-step SDT may use the RO(s) in the sixth IE. However, following the logic mentioned above, if the RO(s) indicated by the seventh IE are not configured, the 2-step SDT may use the RO(s) of normal 2-step, indicated by the fifth IE (e.g. RACH-ConfigGenericTwoStepRA).

To solve the ambiguity, one alternative could be to define (or hard-code) one specific interpretation (e.g. of the above interpretations) in case the network provides (or the UE receives) a configuration such that the RA type of 2-step SDT do not have its own RO(s) (while the RA type of normal 4-step, the RA type of normal 2-step, and the RA type of 4-step SDT may have their own RO(s)). For example, if the UE receives such configuration, the UE determines the RO(s) of a specific RA type according to the first (or second) interpretation.

Case 3: Normal 4-Step and Normal 2-Step have Own RO(s); 4-Step SDT and 2-Step SDT do not have Own RO(s)

The RO(s) in the fourth IE (e.g. RACH-ConfigGeneric) may be configured. The RO(s) in the fifth IE (e.g. RACH-ConfigGenericTwoStepRA) may be configured. The RO(s) in the sixth IE may not be configured. The RO(s) in the seventh IE may not be configured. The configuration may cause the following ambiguity (e.g. same configuration may cause different interpretations):

As an example, in a first interpretation, 4-step SDT may use the RO(s) of normal 4-step and the 2-step SDT may use the RO(s) of normal 2-step. The 4-step SDT may use the RO(s) in the fourth IE (e.g. RACH-ConfigGeneric). The 2-step SDT may use the RO(s) in the fifth IE (e.g. RACH-ConfigGenericTwoStepRA).

As an example, in a second interpretation, 4-step SDT may use the RO(s) of normal 4-step and the 2-step SDT may use the RO(s) of 4-step SDT. The 4-step SDT may use the RO(s) in the fourth IE (e.g. RACH-ConfigGeneric). The 2-step SDT may use the RO(s) in the fourth IE (e.g. RACH-ConfigGeneric). However, following the logic mentioned above, if the RO(s) indicated by the seventh IE are not configured, the 2-step SDT may use the RO(s) of normal 2-step, indicated by the fifth IE (e.g. RACH-ConfigGenericTwoStepRA).

To solve the ambiguity, one alternative could be to define (or hard-code) one specific interpretation (e.g. of the above interpretations) in case the network provides (or the UE receives) a configuration such that the RA type of 4-step SDT and the RA type of 2-step SDT do not have their own RO(s) (while the RA type of normal 4-step and the RA type of normal 2-step may have their own RO). For example, if the UE receives such configuration, the UE determines the RO(s) of a specific RA type according to the first (or second) interpretation.

Based on the RA configurations provided by the NW on a BWP, the UE should unambiguously identify the RO(s) to be used for a corresponding RA type.

Throughout the present disclosure, the RO(s) of a RA type may be one RO and/or a set of ROs. Throughout the present disclosure, the RO configuration(s) of a RA type may include one RO and/or a set of ROs.

To solve the issue, NW could provide a parameter (or indication) to indicate that for a first RA type (e.g. 2-step SDT), the RO(s) of which RA type (e.g. a second RA type or a third RA type) are shared with the first RA type (e.g. 2-step SDT). The parameter (or indication) may be an explicit configuration. The parameter (or indication) may be included in a RO configuration. The parameter (or indication) may indicate which RO(s) (e.g. the RO(s) of which RA type) is used by the first RA type in case the first RA type does not have its own RO configuration(s). The parameter (or indication) may be present if the first RA type does not have its own RO configuration(s). The parameter (or indication) may be absent if the first RA type has its own RO configuration(s).

The shared RO(s) may be related the second RA type and/or the third RA type. The second or third RA type may be different from the first RA type. The first RA type may be at least one of normal 4-step (i.e. without small data), 4-step SDT, normal 2-step (i.e. without small data), and/or 2-step SDT. The second or third RA type may be at least one of normal 4-step (i.e. without small data), 4-step SDT, normal 2-step (i.e. without small data), and/or 2-step SDT. The second RA type and the third RA type may be different. The parameter (or indication) may be configured in the configurations of the first RA type, the second RA type and/or the third RA type. The parameter (or indication) may be a Boolean, an enumerated, and/or an integer. The parameter (or indication) may be provided to a UE (e.g. transmitted from NW to UE). The parameter (or indication) may be provided in a RRC message (e.g. a common signaling, a dedicated signaling, system information, dedicated RRC message, RRC reconfiguration message, or a handover command).

Example 1: 4-Step SDT Configurations have an Individual IE in the Second IE and 2-Step SDT Configurations have an Individual IE in the Third IE (as Shown in FIG. 7)

In one example, there may be a sixth IE for 4-step SDT configured in the second IE (e.g. RACH-ConfigCommon) and a seventh IE for 2-step SDT configured in the third IE (e.g. RACH-ConfigCommonTwoStepRA). There may be a parameter configured in the seventh IE to indicate which RO(s) the 2-step SDT may use when the RO(s) indicated in the seventh IE are not configured. There may be a parameter configured in the third IE (e.g. RACH-ConfigCommonTwoStepRA) to indicate which RO(s) the 2-step SDT may use when the RO(s) indicated in the seventh IE are not configured. There may be a parameter configured in the fourth, fifth, and/or sixth IE to indicate whether the RO(s) in this IE are used by the 2-step SDT when the RO(s) indicated in the seventh IE are not configured.

Figure 8:
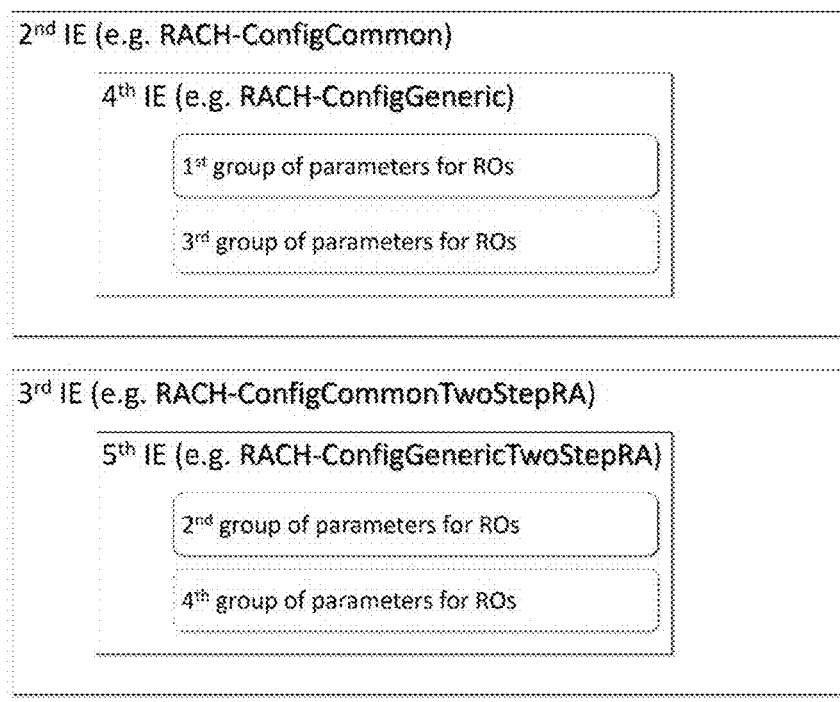
FIG. 8 illustrates an example of RO configuration case 1 (NR with Small Data Transmission (SDT)) according to one exemplary embodiment.

Example 2: 4-Step SDT Configurations are in the Fourth IE and 2-Step SDT Configurations are in the Fifth IE (as Shown in FIG. 8)

In one example, there may be a third group of parameters for 4-step SDT configured in the fourth IE (e.g. RACH-ConfigGeneric) and a fourth group of parameters for 2-step SDT configured in the fifth IE (e.g. RACH-ConfigGenericTwoStepRA). The third group of parameters may align with the first group of parameters for normal 4-step RA. The fourth group of parameters may align with the second group of parameters for normal 2-step RA. There may be a parameter configured in the fourth group of parameters to indicate which RO(s) the 2-step SDT may use when the RO(s) indicated in the fourth group of parameters are not configured. There may be a parameter configured in the fifth IE (e.g. RACH-ConfigGenericTwoStepRA) to indicate which RO(s) the 2-step SDT may use when the RO(s) indicated in the fourth group of parameters are not configured. There may be a parameter configured in the third IE (e.g. RACH-ConfigCommonTwoStepRA) to indicate which RO(s) the 2-step SDT may use when the RO(s) indicated in the fourth group of parameters are not configured. There may be a parameter configure in the first, second, and/or third group of parameters to indicate whether the RO(s) indicated by this group of parameters are used by the 2-step SDT when the RO(s) indicated in the fourth group of parameters are not configured.

Figure 9:
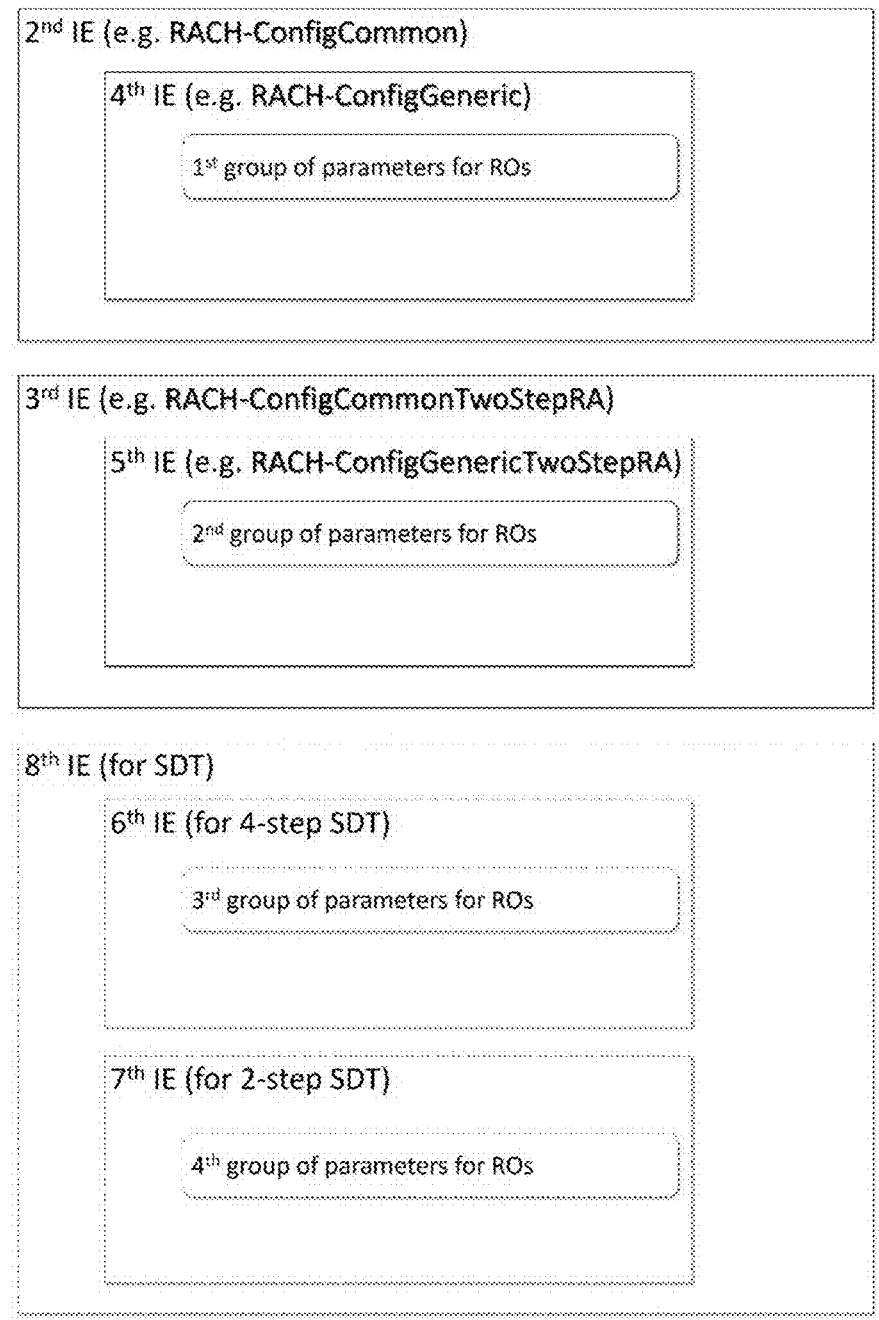
FIG. 9 illustrates an example of RO configuration case 3 (NR with Small Data Transmission (SDT)) according to one exemplary embodiment.

Example 3: 4-Step SDT Configurations have an Individual IE and 2-Step SDT Configurations have an Individual IE Configured in the Eighth IE (as Shown in FIG. 9)

In one example, there may be an eighth IE to specify the SDT configurations. There may be a sixth IE for 4-step SDT and a seventh IE for 2-step SDT in the eighth IE. There may be a parameter configured in the seventh IE to indicate which RO(s) the 2-step SDT may use when the RO(s) indicated in the seventh IE are not configured. There may be a parameter configured in the eighth IE to indicate which RO(s) the 2-step SDT may use when the RO(s) indicated in the seventh IE are not configured. There may be a parameter configured in the fourth, fifth, and/or sixth IE to indicate whether the RO(s) in this IE are used by the 2-step SDT when the RO(s) indicated in the seventh IE are not configured.

Figure 10:
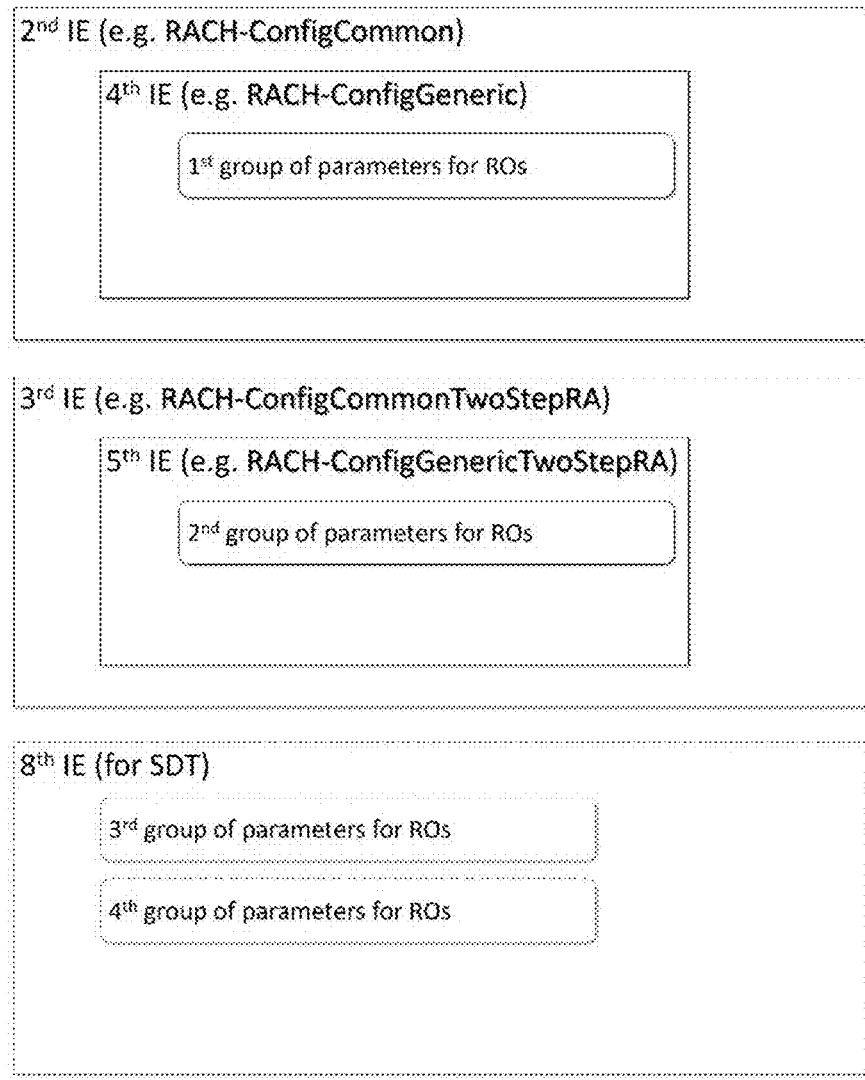
FIG. 10 illustrates an example of RO configuration case 4 (NR with Small Data Transmission (SDT)) according to one exemplary embodiment.

Example 4: 4-Step SDT Configurations and 2-Step SDT Configurations are in the Eighth IE (as Shown in FIG. 10)

In one example, there may be an eighth IE to specify the SDT configurations. There may be a third group of parameters for 4-step SDT and a fourth group of parameters for 2-step SDT in the eighth IE. There may be a parameter configured in the fourth group of parameters to indicate which RO(s) the 2-step SDT may use when the RO(s) indicated in the fourth group of parameters are not configured. There may be a parameter configured in the eighth IE to indicate which RO(s) the 2-step SDT may use when the RO(s) indicated in the fourth group of parameters are not configured. There may be a parameter configured in the first group of parameters, second group of parameters, and/or third group of parameters to indicate whether the RO(s) indicated by this group of parameters are used by the 2-step SDT when the RO(s) indicated in the fourth group of parameters are not configured.

To solve the issue, the parameter (or indication) described above may be provided (or indicated) implicitly. The parameter (or indication) may be an implicit configuration.

As an example, the NW may indicate the RO(s) of which RA type (e.g. a second RA type or a third RA type) are shared with a first RA type (e.g. 2-step SDT) by the presence or absence of one or more specific parameters/configurations/information elements.

As an example, the NW may indicate the RO(s) of which RA type (e.g. a second RA type or a third RA type) are shared with a first RA type (e.g. 2-step SDT) by which parameter, configuration, or information element includes the corresponding configuration associated with the first RA type.

As an example, the NW could indicate the RO(s) of which RA type (e.g. a second RA type or a third RA type) are shared with a first RA type (e.g. 2-step SDT) by configuring the RO configuration(s) of the first RA type (e.g. 2-step SDT) in different IEs or in (or at) different parameters in a IE. The first RA type without its own RO configuration(s) may use the shared RO(s) depends on the configurations. The RO configuration(s) of a RA type may be included in an IE and/or a group of parameters. The shared RO(s) may be related to a second and/or a third RA type. The second or third RA type may be different from the first RA type. The second or third RA type may be normal 4-step, 4-step SDT, normal 2-step, and/or 2-step SDT.

Example 1: Configure Different Groups of Parameters as the RO Configuration(s) of a First RA Type In one example (2-step SDT is the first RA type as an example), there may be a fourth group and a fifth group of parameters to indicate the RO(s) for 2-step SDT. The fifth group of parameters may be a duplication of the fourth group of parameters. One of the two groups of parameters may be present, and the other group of parameters may be absent. The 2-step SDT may use the shared RO(s) if one of the groups of parameters is present, but the RO(s) indicated by this group of parameters are not configured. The 2-step SDT may use the shared RO(s) depend on which group of parameters is present.

There may be a first group of parameters in the fourth IE (e.g. RACH-ConfigGeneric) to indicate the RO(s) for normal 4-step RA. There may be a second group of parameters in the fifth IE (e.g. RACH-ConfigGenericTwoStepRA) to indicate the RO(s) for normal 2-step RA.

Example 1a

There may be a third group of parameters in the fourth IE to indicate the RO(s) for 4-step SDT. There may be a fourth and fifth group of parameters in the fifth IE to indicate the RO(s) for 2-step SDT.

Example 1b

There may be an eighth IE to specify the SDT configurations. There may be a third group of parameters in the eighth IE to indicate the RO(s) for 4-step SDT. There may be a fourth and fifth group of parameters in the eighth IE to indicate the RO(s) for 2-step SDT.

If the fourth group of parameters is present but the RO(s) indicated by the forth group of parameters are not configured, the 2-step SDT may use the RO(s) indicated by the second group of parameters. The 2-step SDT may be considered to share the RO(s) with the normal 2-step RA. If the fifth group of parameters is present but the RO(s) indicated by the fifth group of parameters are not configured, the 2-step SDT may use the RO(s) indicated by the third group of parameters. The 2-step SDT may be considered to share the RO(s) with the 4-step SDT.

Example 2: Configure the RO Configuration(s) of a First RA Type in Different IEs In one example (2-step SDT is the first RA type as an example), the RO(s) for 2-step SDT may be configured in different IEs. The 2-step SDT may use the shared RO(s) if the configurations for 2-step SDT is present in one IE, but the RO(s) indicated by this configuration are not configured. The 2-step SDT may use the shared RO(s) depend on the configurations for 2-step SDT is present in which IE.

There may be a fourth IE (e.g. RACH-ConfigGeneric) in the second IE (e.g. RACH-ConfigCommon) to indicate the RO(s) for normal 4-step RA. There may be a fifth IE (e.g. RACH-ConfigGenericTwoStepRA) in the third IE (e.g. RACH-ConfigCommonTwoStepRA) to indicate the RO(s) for normal 2-step RA.

Figure 11:
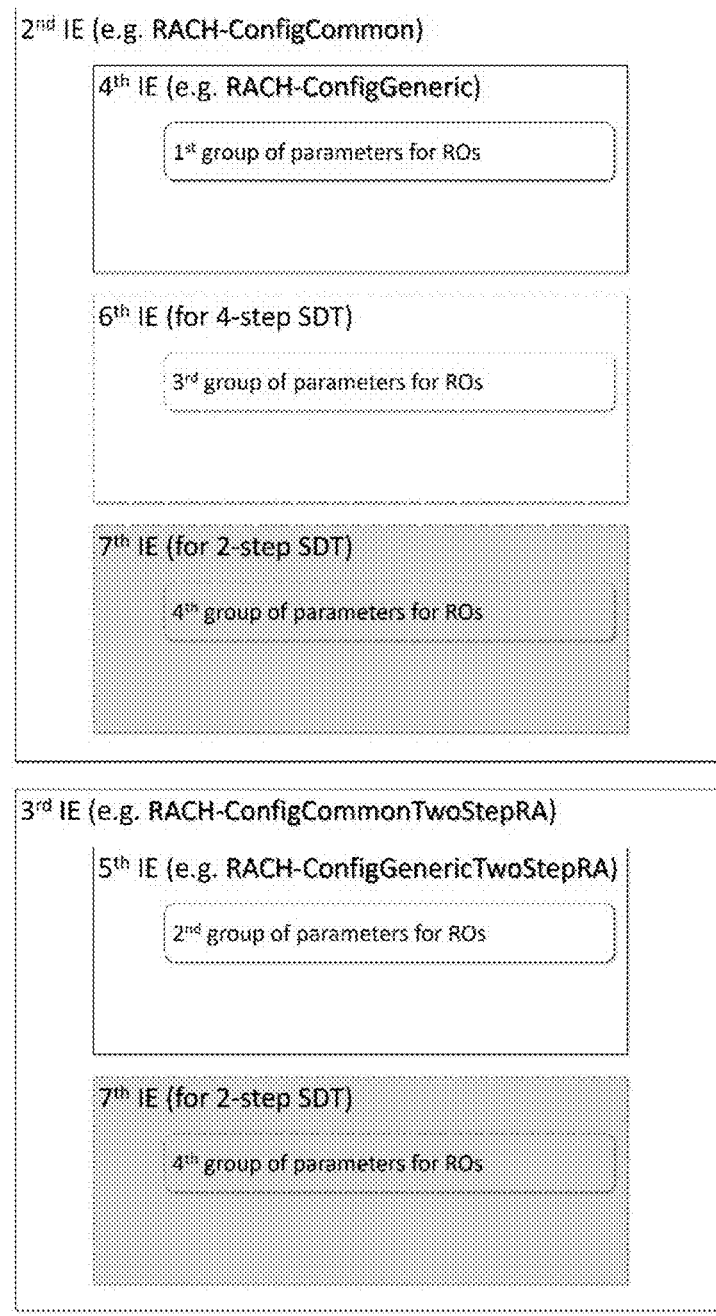
FIG. 11 illustrates example 2a of RO configuration(s) according to one exemplary embodiment.

Example 2a (shown as FIG. 11)

There may be a sixth IE in the second IE to indicate the RO(s) for 4-step SDT. There may be a seventh IE configured in the second or third IE to indicate the RO(s) for 2-step SDT. If the seventh IE is present in the third IE but the RO(s) indicated by the seventh IE are not configured, the 2-step SDT may use the RO(s) indicated by the fifth IE. The 2-step SDT is considered to share the RO(s) with the normal 2-step RA. If the seventh IE is present in the second IE but the RO(s) indicated by the seventh IE are not configured, the 2-step SDT may use the RO(s) indicated by the sixth IE. The 2-step SDT is considered to share the RO(s) with the 4-step SDT.

Figure 12:
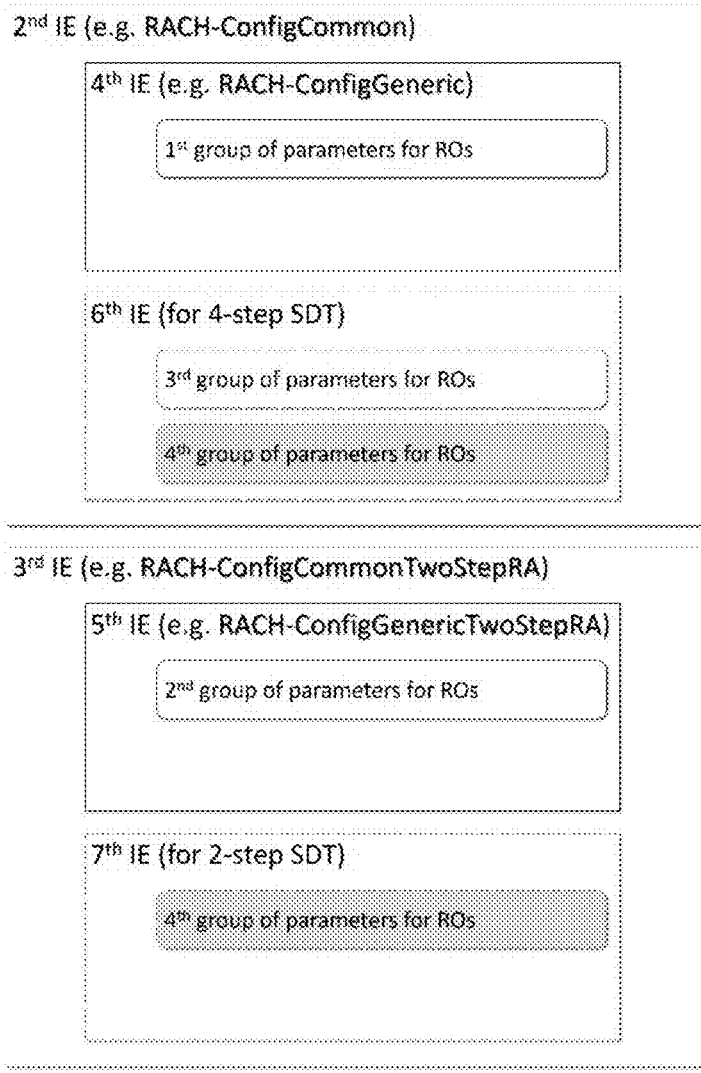
FIG. 12 illustrates example 2b of RO configuration(s) according to one exemplary embodiment.

Example 2B (Shown as FIG. 12)

There may be a sixth IE in the second IE for 4-step SDT. There may be a seventh IE configured in the third IE for 2-step SDT. There may be a third group of parameters in the sixth IE to indicate the ROs for 4-step SDT. There may be a fourth group of parameters in the sixth or seventh IE to indicate the RO(s) for 2-step SDT. If the fourth group of parameters is present in the seventh IE but the RO(s) indicated by the fourth group of parameters are not configured, the 2-step SDT may use the RO(s) indicated by the second group of parameters. The 2-step SDT is considered to share the RO(s) with the normal 2-step RA. If the fourth group of parameters is present in the sixth IE but the RO(s) indicated by the fourth group of parameters are not configured, the 2-step SDT may use the RO(s) indicated by the third group of parameters. The 2-step SDT is considered to share the RO(s) with the normal 2-step RA.

Example 2c

There may be a third group of parameters in the fourth IE to indicate the RO(s) for 4-step SDT. There may be a fourth group of parameters in the fourth or fifth IE to indicate the RO(s) for 2-step SDT. If the fourth group of parameters is present in the fifth IE but the RO(s) indicated by the fourth group of parameters are not configured, the 2-step SDT may use the RO(s) indicated by the second group of parameters. The 2-step SDT is considered to share the RO(s) with the normal 2-step RA. If the fourth group of parameters is present in the fourth IE but the RO(s) indicated by the fourth group of parameters are not configured, the 2-step SDT may use the RO(s) indicated by the third group of parameters. The 2-step SDT is considered to share the RO(s) with the normal 2-step RA.

Example 3: Configure the RO Configuration(s) of a First RA Type at Different Parameters in the Same IE In one example (2-step SDT is the first RA type as an example), the RO(s) for 2-step SDT may be configured at different parameters in the same IE. The 2-step SDT may use the shared RO(s) if the configurations for 2-step SDT is present, but the RO(s) indicated by this configuration are not configured. The 2-step SDT may use the shared RO(s) depend on the configurations for 2-step SDT is present at which parameter.

There may be a fourth IE (e.g. RACH-ConfigGeneric) configured at a first parameter (e.g. rach-ConfigGeneric) in the second IE (e.g. RACH-ConfigCommon) to indicate the RO(s) for normal 4-step RA. There may be a fifth IE (e.g. RACH-ConfigGenericTwoStepRA) configured at a second parameter (e.g. rach-ConfigGenericTwoStepRA) in the third IE (e.g. RACH-ConfigCommonTwoStepRA) to indicate the RO(s) for normal 2-step RA.

Figure 13:
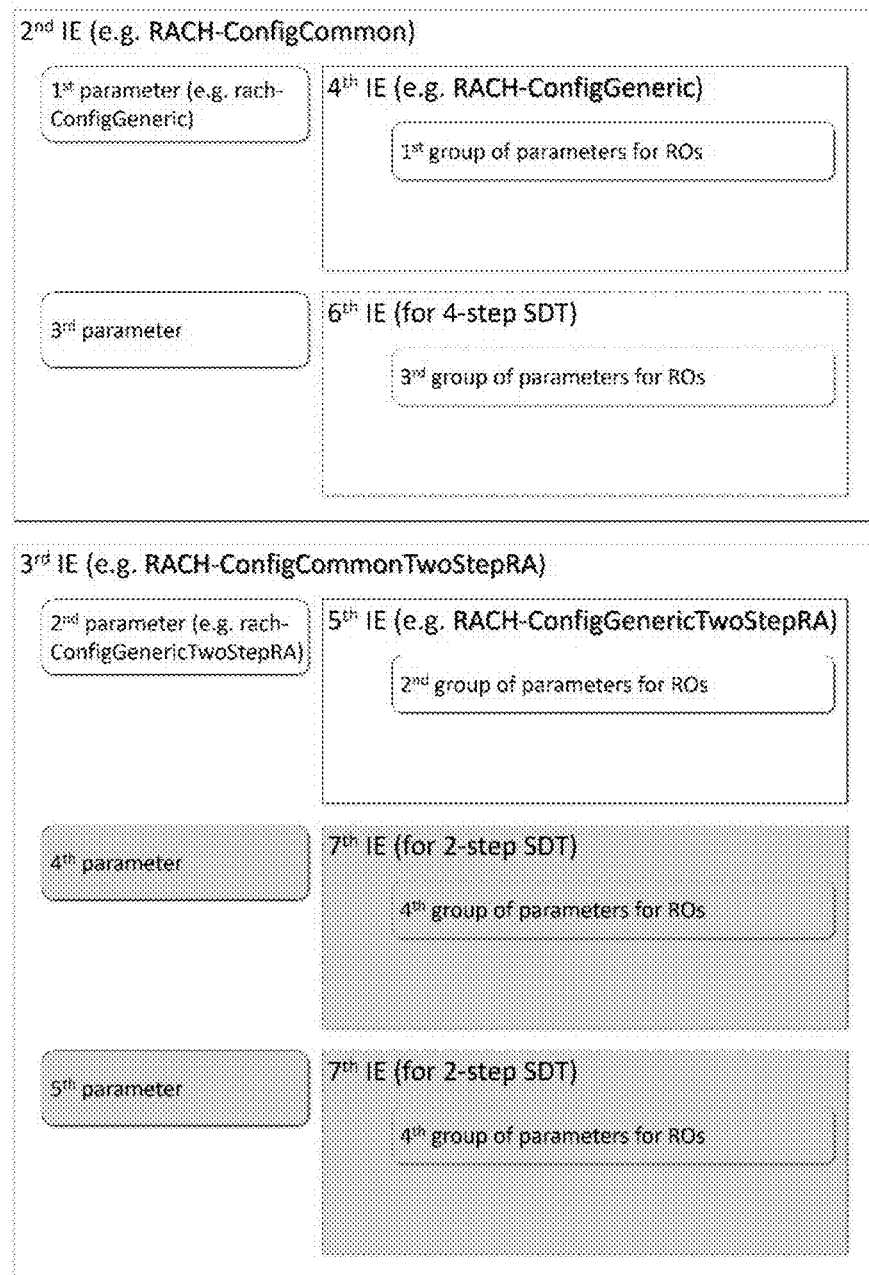
FIG. 13 illustrates example 3a of RO configuration(s) according to one exemplary embodiment.

Example 3a (as Shown in FIG. 13)

There may be a sixth IE configured at a third parameter in the second IE to indicate the RO(s) for 4-step SDT. There may be a seventh IE configured at a fourth or fifth parameter in the third IE to indicate the RO(s) for 2-step SDT.

Figure 14:
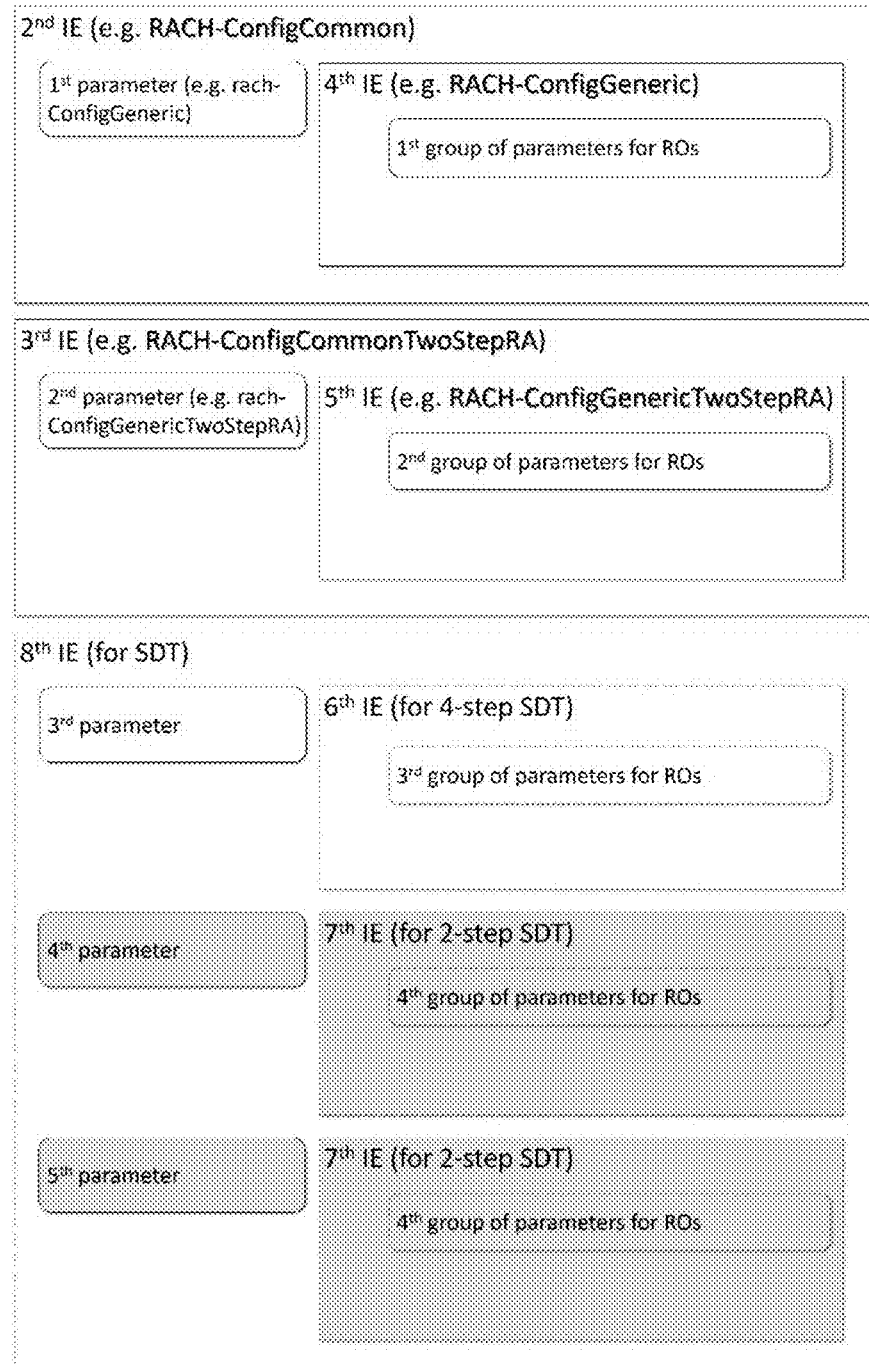
FIG. 14 illustrates example 3b of RO configuration(s) according to one exemplary embodiment.

Example 3b (as Shown in FIG. 14)

There may be an eighth IE to specify the SDT configurations. There may be a sixth IE configured at a third parameter in the eighth IE to indicate the RO(s) for 4-step SDT. There may be a seventh IE configured at a fourth or a fifth parameter in the eighth IE to indicate the RO(s) for 2-step SDT.

If the seventh IE is present at the fourth parameter (and is absent at the fifth parameter) but the RO(s) indicated by the seventh IE are not configured, the 2-step SDT may use the RO(s) indicated by the fifth IE. The 2-step SDT is considered to share the RO(s) with the normal 2-step RA. If the seventh IE is present at the fifth parameter (and is absent at the fourth parameter) but the RO(s) indicated by the seventh IE are not configured, the 2-step SDT may use the RO(s) indicated by the sixth IE. The 2-step SDT is considered to share the RO(s) with the 4-step SDT.

To solve the issue, it may not be allowed (for the network) to provide a configuration (or any configuration) such that a first RA type (e.g. 2-step SDT) shares the RO(s) with a second RA type if the RO(s) of the first RA type are not configured. Alternatively or additionally, it may be allowed (for the network) to provide a configuration (or any configuration) such that the first RA type (e.g. 2-step SDT) shares the RO(s) with a third RA type if the RO(s) of the first RA type are not configured.

Alternatively or additionally, network may not (or shall not) provide a configuration (or any configuration) such that a first RA type (e.g. 2-step SDT) shares the RO(s) with a second RA type if the RO(s) of the first RA type are not configured. Alternatively or additionally, network may be prohibited to provide (or prevented from providing) a configuration (or any configuration) such that a first RA type (e.g. 2-step SDT) shares the RO(s) with a second RA type if the RO(s) of the first RA type are not configured. Alternatively or additionally, network may provide a configuration (or any configuration) with a restriction (or a limitation) such that a first RA type (e.g. 2-step SDT) does not (or shall not or is unable to) share the RO(s) with a second RA type if the RO(s) of the first RA type are not configured.

The configuration (or any configuration) may refer to the configuration (or any configuration) used to indicate RO(s) of the first RA type. The first RA type may be able to directly share the RO(s) with one RA types (e.g. the second/third RA type). The first RA type may be unable to directly share the RO(s) with more than one RA type (e.g. the second/third RA type). The shared RO(s) may be related to the second/third RA type (other than the first RA type). The first RA type may be at least one of normal 4-step (i.e. without small data), 4-step SDT, normal 2-step (i.e. without small data), and/or 2-step SDT. The second RA type may be at least one of normal 4-step (i.e. without small data), 4-step SDT, normal 2-step (i.e. without small data), and/or 2-step SDT. The third RA type may be at least one of normal 4-step (i.e. without small data), 4-step SDT, normal 2-step (i.e. without small data), and/or 2-step SDT. The second RA type and the third RA type may be different.

In one example, the NW may configure 2-step SDT to share the RO(s) of normal 2-step, 4-step SDT to share the RO(s) of normal 4-step, and normal 2-step to share the RO(s) of normal 4-step. If the RO(s) of 2-step SDT are not configured, the 2-step SDT may use the RO(s) of normal 2-step. If the RO(s) of 4-step SDT are not configured, the 4-step SDT may use the RO(s) of normal 4-step. If the RO(s) of normal 2-step are not configured, the normal 2-step may use the RO(s) of normal 4-step. The 2-step SDT may not use the RO(s) of 4-step SDT if the RO(s) of 2-step SDT are not configured, unless the RO(s) of 4-step SDT and normal 2-step are not configured (i.e. 2-step SDT uses the RO(s) of normal 2-step, normal 2-step uses the RO(s) of normal 4-step, and 4-step SDT uses the RO(s) of normal 4-step). The 2-step SDT may not use the RO(s) of normal 4-step if the RO(s) of 2-step SDT are not configured, unless the RO(s) of normal 2-step are not configured (i.e. 2-step SDT uses the RO(s) of normal 2-step, and normal 2-step uses the RO(s) of normal 4-step).

In one example, the NW may configure 2-step SDT to share the RO(s) of 4-step SDT, 4-step SDT to share the RO(s) of normal 4-step, and normal 2-step to share the RO(s) of normal 4-step. If the RO(s) of 2-step SDT are not configured, the 2-step SDT may use the RO(s) of 4-step SDT. If the RO(s) of 4-step SDT are not configured, the 4-step SDT may use the RO(s) of normal 4-step. If the RO(s) of normal 2-step are not configured, the normal 2-step may use the RO(s) of normal 4-step. The 2-step SDT may not use the RO(s) of normal 2-step if the RO(s) of 2-step SDT are not configured, unless the RO(s) of 4-step SDT and normal 2-step are not configured (i.e. 2-step SDT uses the RO(s) of 4-step SDT, 4-step SDT uses the RO(s) of normal 4-step, and normal 2-step uses the RO(s) of normal 4-step). The 2-step SDT may not use the RO(s) of normal 4-step if the RO(s) of 2-step SDT are not configured, unless the RO(s) of 4-step SDT are not configured (i.e. 2-step SDT uses the RO(s) of 4-step SDT, and 4-step SDT uses the RO(s) of normal 4-step).

The above method(s) to identify (or interpret) the RO(s) for a specific RA type (e.g. the first RA type) could be applied by a UE and/or a network node. Since the UE and the NW should have common understanding on the RO(s) corresponding to different RA configurations, the UE and the NW should apply the same method to identify (or interpret) the RO(s) based on the RA configuration(s) provided by the NW (on a BWP). The UE may determine the RO(s) of a specific RA type based on the configuration provided by NW.

The UE may initiate a 4-step RA to transmit small data when (or in response to) the upper layer indicates a small data transmission and the radio condition is below a threshold (e.g. rsrp-Threshold-msgA). The UE may initiate a 2-step RA to transmit small data when (or in response to) the upper layer indicates a small data transmission and radio condition is above a threshold (e.g. rsrp-Threshold-msgA).

The first RA type may be at least one of normal 4-step (i.e. without small data), 4-step SDT, normal 2-step (i.e. without small data), and/or 2-step SDT. The second or third RA type may be at least one of normal 4-step (i.e. without small data), 4-step SDT, normal 2-step (i.e. without small data), and/or 2-step SDT. The second RA type or the third RA type may be different from the first RA type. The second RA type and the third RA type may be different.

The different types of RA may share the same RO(s) when the NW does not configure another PRACH resources. The different types of RA may share the same RO(s) when the PRACH resources are not enough. The different types of RA may share the same RO(s) when the NW supposes another PRACH resources to be unnecessary.

The UE may receive some configurations related to RA resources for small data transmission provided by the NW. For example, the RA configurations may include some parameters to indicate the RO(s). For example, the RA configurations may include some parameters and/or occasions to indicate whether the different types of RA share the same RO(s). For example, the RA configurations may include the configuration about the shared RO(s). The RA configurations may be provided in system information, RRC signaling, and/or MAC CE.

The UE may be referred to the UE, or a Medium Access Control (MAC) entity of the UE. The UE may be a NR device. The UE may be a NR-light device, as discussed in 3GPP RP-193238. The UE may be a reduced capability device, as discussed in 3GPP RP-193238. The UE may be a mobile phone. The UE may be a wearable device. The UE may be a sensor. The UE may be a stationary device.

The NW may be a base station. The NW may be an access point. The NW may be an eNB. The NW may be a gNB.

A RA procedure could be for small data transmission if the upper layer indicates a small data transmission. A RA procedure could be for small data transmission if the upper layer requests the resume of a suspended RRC connection for transmitting small data in RRC_INACTIVE state.

During a RA procedure in NR, the UE uses a preamble within part of total 64 preambles to perform Msg1 (for 4-step RA) and/or MSGA (for 2-step RA) transmission to NW. The NW may recognize the RA types from the received preamble and then transmit corresponded Msg2 and/or MSGB to the UE. The RA types may include: 2-step CBRA, 4-step CBRA, 2-step CFRA, and/or 4-step CFRA. Based on the RA types, the UE should determine a preamble to use based on RA configurations provided by NW. The preamble may be assigned by the NW (e.g. for CFRA) or selected by the UE (e.g. for CBRA). The UE should select a preamble among the preambles allocated for the corresponding RA types. The RA parameters to indicate a partition of preambles corresponded to different RA types (e.g. 2-step CBRA, 4-step CBRA, 2-step CFRA, 4-step CFRA) are provided by RRC, as discussed in 3GPP R2-2002379 and R2-2002380.

For Contention Free Random Access (CFRA), the NW assigns a dedicated preamble to the UE by Physical Downlink Control Channel (PDCCH) order (e.g. for Downlink (DL) data arrival) and/or RRC configurations (e.g. for handover). The dedicated preamble is part of CFRA preambles within the total 64 preambles. The UE uses the dedicated preamble to process Msg1 transmission and then Msg2 receiving in 4-step RA. The UE uses the dedicated preamble to process MSGA transmission and then MSGB receiving in 2-step RA.

For Contention Based Random Access (CBRA), the UE selects a preamble from part of CBRA preambles within the total 64 preambles. The UE uses the selected preamble to process Msg1 transmission, Msg2 receiving, Msg3 transmission and then Msg4 receiving in 4-step RA. The UE uses the selected preamble to process MSGA transmission and then MSGB receiving in 2-step RA.

The RO(s) are given in RA configurations by RRC (e.g. rach-ConfigGeneric, rach-ConfigGenericTwoStepRA as discussed in 3GPP R2-2002380) on a BWP. If the PRACH resources (e.g. msgA-PRACH-ConfigurationIndex as discussed in 3GPP R2-2002380) are not given in the 2-step RA configuration (e.g. rach-ConfigGenericTwoStepRA), the 2-step RA is considered to share the RO(s) with 4-step RA on a BWP.

Figure 15:
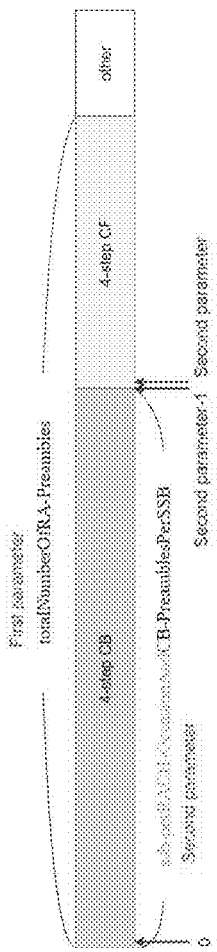
FIG. 15 illustrates an example of RA preamble partition for 4-step RA with separated RO(s) from 2-step RA according to one exemplary embodiment.

As shown in FIG. 15, for the case of separated RO(s) between 4-step and 2-step RA, two RA parameters may be needed to determine the preambles that may be selected for the RA type of 4-step RA. A first parameter (e.g. totalNumberOfRA-Preambles as discussed in 3GPP R2-2002380) may be used to indicate the total number of 4-step CBRA and CFRA preambles. A second parameter (e.g. CB-PreamblesPerSSB in ssb-perRACH-OcasionAndCB-PreamblesPerSSB as discussed in 3GPP R2-2002380) may be used to indicate the number of 4-step CBRA preambles. The 4-step CBRA preambles start from zero to the second parameter minus one, and the 4-step CFRA preambles start from the second parameter to the first parameter minus one.

Figure 16:
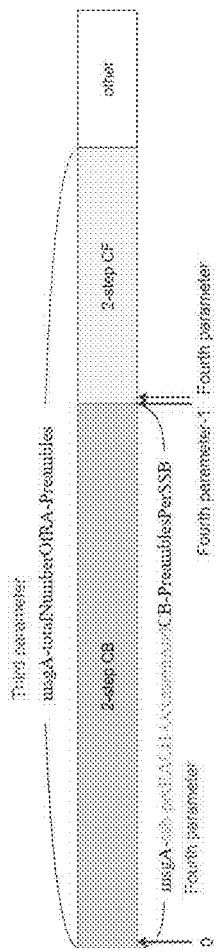
FIG. 16 illustrates an example of RA preamble partition for 2-step RA with separated RO(s) from 4-step RA according to one exemplary embodiment.

As shown in FIG. 16, for the case of separated RO(s) between 4-step and 2-step RA, two RA parameters may be needed to determine the preambles that may be selected for the RA type of 2-step RA. There is a third parameter (e.g. msgA-totalNumberOfRA-Preambles [6]) to indicate the total number of 2-step CBRA and CFRA preambles. There may be a forth parameter (e.g. CB-PreamblesPerSSB in msgA-ssb-perRACH-OcasionAndCB-PreamblesPerSSB as discussed in 3GPP R2-2002380) to indicate the number of 2-step CBRA preambles. If the forth parameter is absent, the UE uses the second parameter as substitution. The 2-step CBRA preambles start from zero to the forth parameter minus one, and the 2-step CFRA preambles start from the forth parameter to the second parameter minus one.

Figure 17:
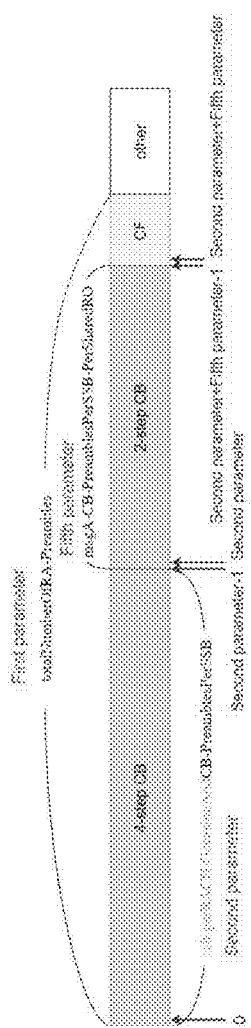
FIG. 17 illustrates an example of RA preamble partition for 4-step RA and 2-step RA with shared RO(s) according to one exemplary embodiment.

As shown in FIG. 17, for the case of shared RO(s) between 4-step and 2-step RA, three RA parameters may be needed to determine the preambles that may be selected for the RA type of 2-step CBRA or 4-step CBRA. There is a first parameter (e.g. totalNumberOfRA-Preambles as discussed in 3GPP R2-2002380) to indicate the total number of CBRA and CFRA preambles. There is a second parameter (e.g. CB-PreamblesPerSSB in ssb-perRACH-OcasionAndCB-PreamblesPerSSB) to indicate the number of 4-step CBRA preambles. There is a fifth parameter (e.g. msgA-CB-PreamblesPerSSB-PerSharedRO as discussed in 3GPP R2-2002380) to indicate the number of 2-step CBRA preambles. The 4-step CBRA preambles start from zero to the second parameter minus one, the 2-step CBRA preambles start from the second parameter to the second parameter plus the fifth parameter minus one, and the CFRA preambles starts from the second parameter plus the fifth parameter to the first parameter minus one.

Figure 18:
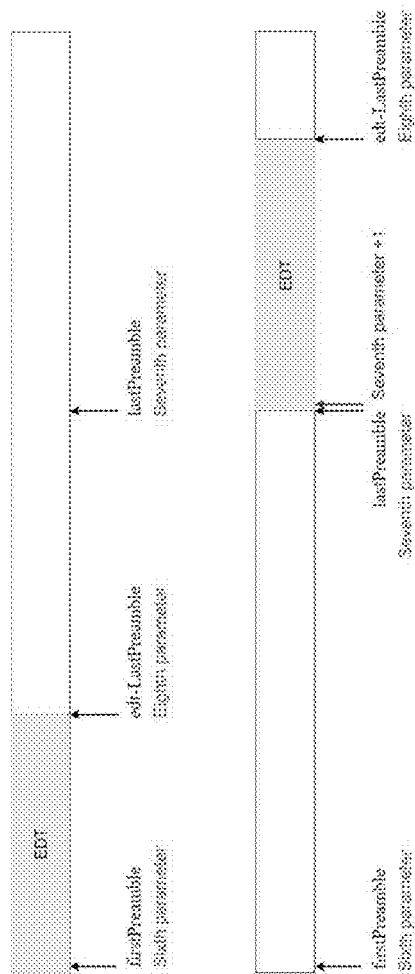
FIG. 18 illustrates an example of RA preamble partition for EDT in LTE (upper: separated PRACH resource between RA with EDT and without EDT; and lower: shared PRACH resource between RA with EDT and without EDT) according to one exemplary embodiment.

During a RA procedure in LTE, the RA parameters to indicate a partition of preambles is provided by RRC, as discussed in 3GPP TS 36.331. Currently 2-step RA is not applicable in LTE. There are a sixth and a seventh parameters (e.g. firstPreamble and lastPreamble) to indicate the RA preambles except for EDT. There is an eighth parameter (e.g. edt-LastPreamble) to indicate the RA preambles for EDT. If RA with EDT is configured another PRACH resource (e.g. edt-PRACH-ParametersCE) different from PRACH resource (e.g. PRACH-ParametersCE) for RA without EDT, the RA preambles for EDT start from the sixth parameter to the eighth parameter (shown in the upper part of FIG. 18). Otherwise, the RA preambles for EDT start from the seventh parameter plus one to the eighth parameter (shown in as the lower part of FIG. 18).

To enable RACH-based small data transmission in NR, RA preamble and/or RA resource partition between normal RA (e.g. not used for small data transmission) and SDT RA (e.g. used for small data transmission) may be needed. If both 2-step RA and 4-step RA are supported, RA preamble and/or RA resource partition between 2-step RA and 4-step RA may be needed.

During RA procedure for small data transmission in NR, two parameters may be needed to determine the RA preambles. There may be a ninth parameter to indicate the RA preambles for 4-step small data transmission, and a tenth parameter to indicate the RA preambles for 2-step small data transmission. The ninth and tenth parameters may be the number of preambles of 4-step SDT RA and 2-step SDT RA. The ninth and tenth parameters may be the last preamble number of 4-step SDT RA and 2-step SDT RA.

According to EDT in LTE, if the RA with early data and without early data have separated RO(s), the preambles for RA with early data start at the first preamble of preambles for RA without early data; otherwise (i.e. the RA with early data and without early data have shared RO(s)), the preambles for RA with early data start at the next preamble after the last preamble of preambles for RA without early data. If the RA with small data and without small data has separated RO(s), the preambles for 4-step RA with small data start at the first preamble of preambles for 4-step RA without small data, and the preambles for 2-step RA with small data start at the first preamble of preambles for 2-step RA without small data. If the RA with small data and without small data has shared RO(s), the preambles for 4-step RA with small data start at the next preamble after the last preamble of preambles for 4-step RA without small data, and the preambles for 2-step RA with small data start at the next preamble after the last preamble of preambles for 2-step RA without small data.

Considering small data transmission in NR, depending on whether the RO(s) between 2-step RA and 4-step RA is shared (or separated) and whether the RO(s) between RA with and without small data is shared (or separated), there may be four kinds of RO configuration cases as discussed below.

Case 1: 4-Step and 2-Step RA have Separated RO(s), and RA with Small Data and Without Small Data have Separated RO(s)

Figure 19:
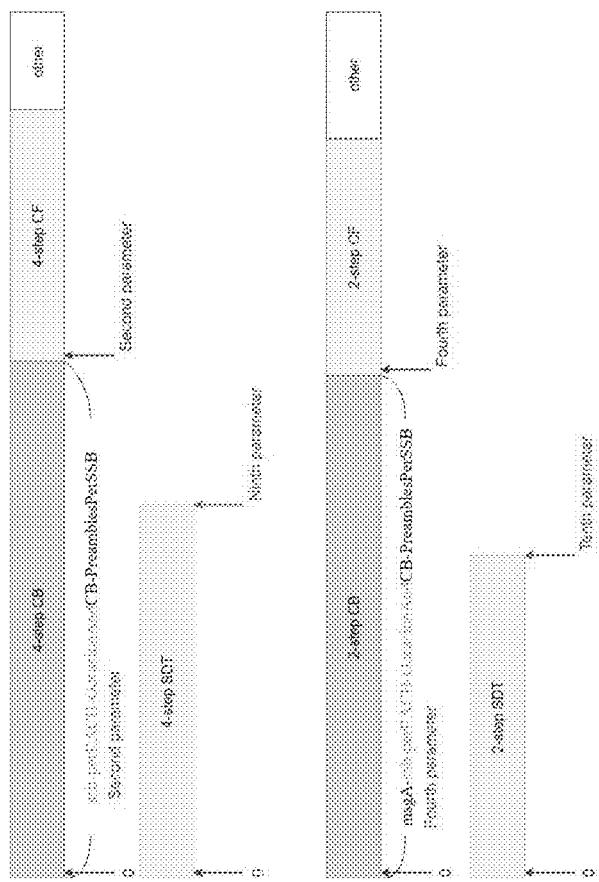
FIG. 19 illustrates an example of RA preamble partition for RO configuration case 1 according to one exemplary embodiment.

As shown in FIG. 19, the RA preambles for 4-step small data transmission may start from zero to the ninth parameter minus one (or to the ninth parameter). The RA preambles for 2-step small data transmission may start from zero to the tenth parameter minus one (or to the tenth parameter).

Case 2: 4-Step and 2-Step RA have Separated RO(s), and RA with Small Data and Without Small Data have Shared RO(s)

Figure 20:
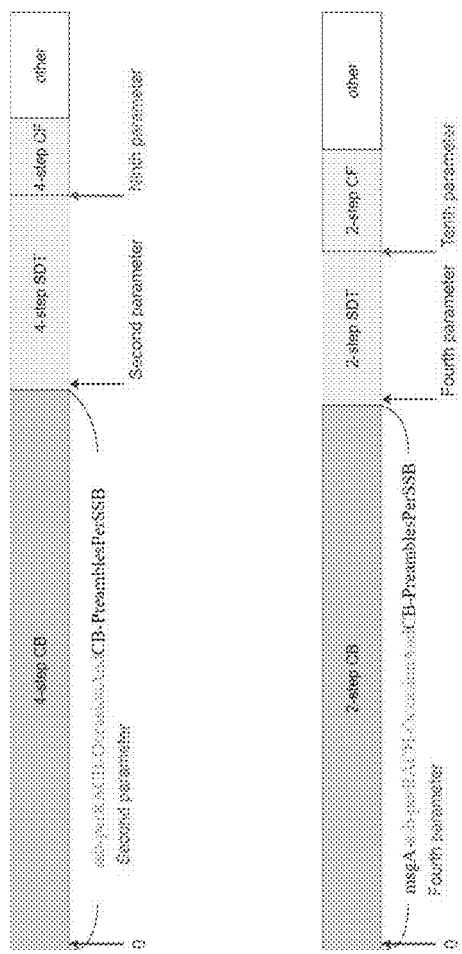
FIG. 20 illustrates an example of RA preamble partition for RO configuration case 2 according to one exemplary embodiment.

As shown in FIG. 20, the RA preambles for 4-step small data transmission may start from the second parameter to the second parameter plus the ninth parameter minus one (or to the ninth parameter). The RA preambles for 2-step small data transmission may start from the forth parameter to the forth parameter plus the tenth parameter minus one (or to the tenth parameter).

Case 3: 4-Step and 2-Step RA have Shared RO(s), and RA with Small Data and Without Small Data have Separated RO(s)

Figure 21:
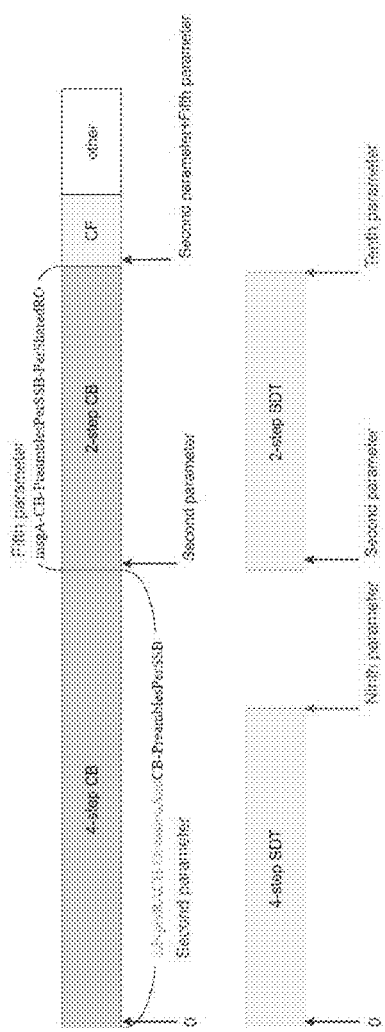
FIG. 21 illustrates an example of RA preamble partition for RO configuration case 3 according to one exemplary embodiment.

As shown in FIG. 21, the RA preambles for 4-step small data transmission may start from zero to the ninth parameter minus one (or to the ninth parameter). The RA preambles for 2-step small data transmission may start from the second parameter to the second parameter plus the tenth parameter minus one (or to the tenth parameter).

Case 4: 4-Step and 2-Step RA have Shared RO(s), and RA with Small Data and Without Small Data have Shared RO(s)

Figure 22:
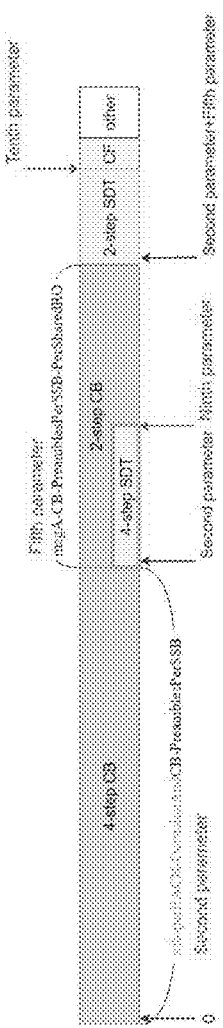
FIG. 22 illustrates an example of RA preamble partition for RO configuration case 4 according to one exemplary embodiment.

As shown in FIG. 22, the RA preambles for 4-step small data transmission may start from the second parameter to the second parameter plus the ninth parameter minus one (or to the ninth parameter). The RA preambles for 2-step small data transmission may start from the second parameter plus the fifth parameter to the second parameter plus the fifth parameter plus the tenth parameter minus one (or to the tenth parameter). However, in this situation, the preambles for 4-step RA with small data may overlap with the preambles for 2-step RA without small data. When the NW receives one of the preambles from this overlapped part, the NW could not recognize whether the UE performs a RA procedure for small data transmission or not and whether the RA procedure is 2-step or 4-step.

Throughout the present disclosure, the preamble may be the Random Access (RA) preamble. Throughout the present disclosure, preambles for a RA type are (a set of) preambles used for the RA type. The UE may use one of the preamble from preambles for a RA type to perform the RA procedure of the RA type.

Throughout the present disclosure, one, some, and/or all instances of "starting point" may correspond to, may be supplemented with and/or may be replaced by "starting position", "starting index". The starting point of preambles may be the first preamble index of the preambles.

To solve the issue, the UE and the NW need to have common understanding on how to interpret the parameters or configurations for RA preamble partitions. Based on the RA configurations provided by the NW on a BWP, the UE should unambiguously identify the preambles that can be used for a corresponding RA type (e.g. 4-step or 2-step, CB or CF, for small data transmission or not).

One method to solve the issue is that NW provides two parameters to indicate the preambles corresponding a RA type. NW may provide the two parameters for each RA type. One parameter may indicate the starting preamble for the RA type. The other parameter may indicate the ending preamble for the RA type (or the number of preambles for the RA type). For this method, some of the parameters may be redundant since the ending preamble for one RA type plus one may be the starting preamble for another RA type. To reduce the signalling overhead, parameter reuse may be considered among different RA types. However, depending on whether some RA type(s) is configured or not, how to reuse the parameter may be different. Some predefined rule(s) about how to interpret the parameters or configurations should be specified.

To solve the issue, the UE may need to identify which of the RA type(s) share the same RO(s). This may be based on the configuration of the RA type(s) provided by network. For example, if RO(s) of a specific RA type are not configured, it may imply that the RO(s) of the specific RA type are shared by other RA type(s). If more than one RA type shares the same RO(s), the UE may need to determine the order (or sequence) of the RA type(s) sharing the same RO(s) for the preamble partition. The order may be predefined (or hardcoded). And the UE could derive the starting point of a specific RA type based on the order. For example, the preamble range of the first RA type in the order may be from 0 to a value configured for the first RA type. And the preamble range of the second RA type in the order may be from the value configured for the first RA type plus one to the value configured for the second RA type, and so on.

One general concept of the invention is that the UE could identify (or interpret) the starting point of RA preambles corresponding to a RA type (e.g. a first RA type) based on one or more RA parameters for another RA type(s) (e.g. based on RA parameters of more than two RA types). Alternatively or additionally, the RA parameter of which RA type is used to derive the starting point of RA preamble corresponding to the RA type (e.g. the first RA type) may depend on whether one or more RA types are configured by the NW. This may be applied for the case that the different types of RA (e.g. 4-step and/or 2-step RAs with and/or without small data) share the same RO(s).

For example, the UE could identify (or interpret) the starting point of RA preambles for small data transmission differently according to the RA configurations provided by the NW on a BWP. The NW may configure 4-step RA without small data, 2-step RA without small data, 4-step RA with small data, and/or 2-step RA with small data on a BWP. The NW may configure a ninth parameter in the RA configurations for 4-step small data transmission on a BWP. The NW may configure a tenth parameter in the RA configurations for 2-step small data transmission on a BWP.

The different types of RA may share the same RO(s) when the NW does not configure another PRACH resources. The different types of RA may share the same RO(s) when the PRACH resources are not enough. The different types of RA may share the same RO(s) when the NW considers another PRACH resource to be unnecessary.

For the RA configurations without small data with shared RO(s), there may be both 4-step and 2-step RA configurations on a BWP. For the RA configurations without small data with shared RO(s), there may be only 4-step RA configuration on a BWP. For the RA configurations with small data with shared RO(s), there may be both 4-step and 2-step RA configurations on a BWP. For the RA configurations with small data with shared RO(s), there may be only 4-step RA configuration on a BWP. For the RA configurations with small data with shared RO(s), there may be only 2-step RA configuration on a BWP.

The UE may identify (or interpret) the starting point of 4-step RA preambles for small data transmission with shared RO(s) at the second parameter. The UE may identify (or interpret) the starting point of 4-step RA preambles for small data transmission with shared RO(s) at the second parameter plus the fifth parameter. The UE may identify (or interpret) the starting point of 4-step RA preambles for small data transmission with shared RO(s) at the second parameter plus the fifth parameter plus the tenth parameter (or at the tenth parameter plus one). The UE may identify (or interpret) the starting point of 4-step RA preambles for small data transmission with shared RO(s) at the second parameter plus the tenth parameter (or at the tenth parameter plus one). The UE may identify (or interpret) the ending point of 4-step RA preambles for small data transmission with shared RO(s) at the ninth parameter (or at the starting point plus the ninth parameter minus one).

The UE may identify (or interpret) the starting point of 2-step RA preambles for small data transmission with shared RO(s) at the second parameter. The UE may identify (or interpret) the starting point of 2-step RA preambles for small data transmission with shared RO(s) at the second parameter plus the fifth parameter. The UE may identify (or interpret) the starting point of 2-step RA preambles for small data transmission with shared RO(s) at the second parameter plus the fifth parameter plus the ninth parameter (or at the ninth parameter plus one). The UE may identify (or interpret) the starting point of 2-step RA preambles for small data transmission with shared RO(s) at the second parameter plus the ninth parameter (or at the ninth parameter plus one). The UE may identify (or interpret) the ending point of 2-step RA preambles for small data transmission with shared RO(s) at the tenth parameter (or at the starting point plus the tenth parameter minus one).

FIG. 23 is a table showing examples of examples of preamble starting points for small data transmission with shared RO(s) according to one exemplary embodiment. The following are some examples shown in FIG. 23.

Figure 24:
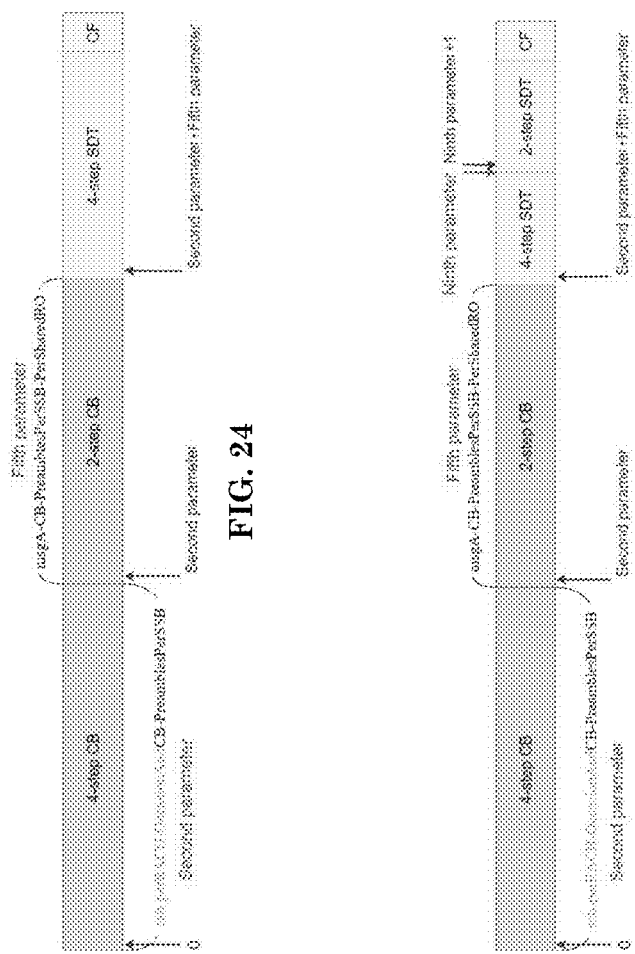
FIG. 24 illustrates example 1 of RA preamble partition for SDT with shared RO(s) according to one exemplary embodiment.

Example 1: 4-Step RA Without Small Data, 2-Step RA Without Small Data, and 4-Step RA with Small Data In one example, there may be configurations of 4-step RA without small data, 2-step RA without small data, and 4-step RA with small data on a BWP. And the three types of RA share the same RO(s). The UE may identify (or interpret) the starting point of 4-step RA preambles for small data transmission at the second parameter plus fifth parameter. The example is shown in FIG. 24.

Example 2: 4-Step RA Without Small Data, 2-Step RA Without Small Data, and 2-Step RA with Small Data In one example, there may be configurations of 4-step RA without small data, 2-step RA without small data, and 2-step RA with small data on a BWP. And the three types of RA share the same RO(s). The UE may identify (or interpret) the starting point of 2-step RA preambles for small data transmission at the second parameter plus fifth parameter.

Example 3: 4-Step RA Without Small Data, 2-Step RA Without Small Data, 4-Step RA with Small Data, and 2-Step RA with Small Data In one example, there may be configurations of 4-step RA without small data, 2-step RA without small data, 4-step RA with small data, and 2-step RA with small data, and 2-step RA with small data on a BWP. And the four types of RA share the same RO(s).

Example 3a

Figure 25:
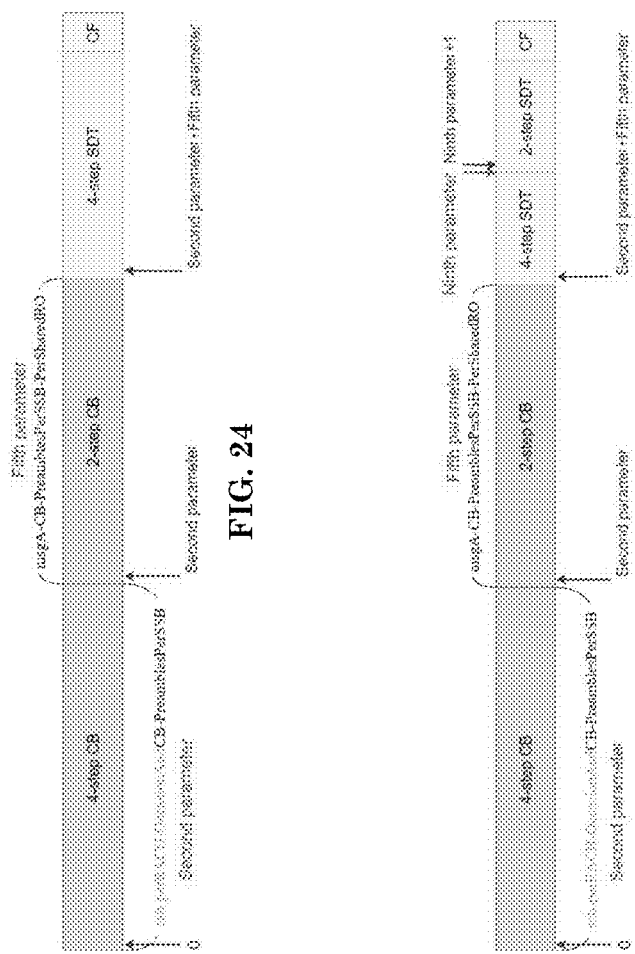
FIG. 25 illustrates example 3a of RA preamble partition for SDT with shared RO(s) according to one exemplary embodiment.

The UE may identify (or interpret) the starting point of 4-step RA preambles for small data transmission at the second parameter plus fifth parameter, and the starting point of 2-step RA preambles for small data transmission at the second parameter plus fifth parameter plus the ninth parameter (or at the ninth parameter plus one). The example is shown in FIG. 25.

Example 3b

Figure 26:
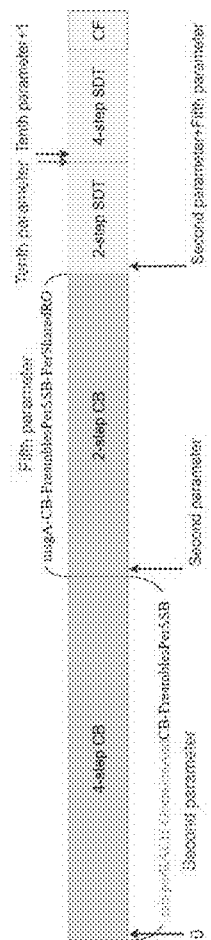
FIG. 26 illustrates example 3b of RA preamble partition for SDT with shared RO(s) according to one exemplary embodiment.

The UE may identify (or interpret) the starting point of 4-step RA preambles for small data transmission at the second parameter plus fifth parameter plus the tenth parameter (or at the tenth parameter plus one), and the starting point of 2-step RA preambles for small data transmission at the second parameter plus fifth parameter. The example is shown in FIG. 26.

Example 3c

Figure 27:
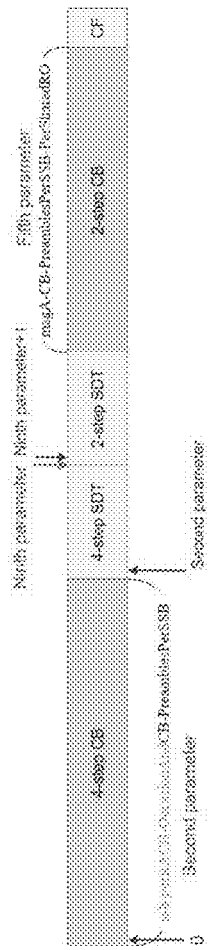
FIG. 27 illustrates example 3c of RA preamble partition for SDT with shared RO(s) according to one exemplary embodiment.

The UE may identify (or interpret) the starting point of 4-step RA preambles for small data transmission at the second parameter, and the starting point of 2-step RA preambles for small data transmission at the second parameter plus the ninth parameter (or at the ninth parameter plus one). The example is shown in FIG. 27.

Example 3d

The UE may identify (or interpret) the starting point of 4-step RA preambles for small data transmission at the second parameter plus the tenth parameter (or at the tenth parameter plus one), and the starting point of 2-step RA preambles for small data transmission at the second parameter.

Example 3e

Figure 28:
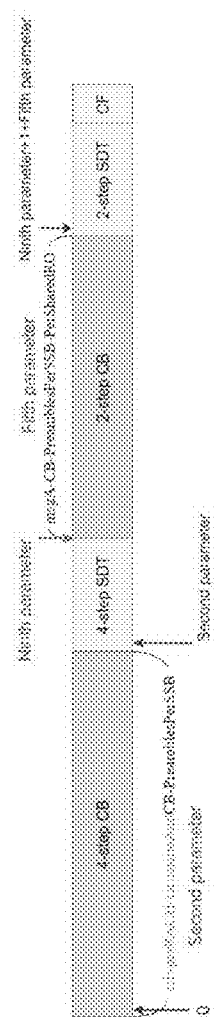
FIG. 28 illustrates example 3e of RA preamble partition for SDT with shared RO(s) according to one exemplary embodiment.

The UE may identify (or interpret) the starting point of 4-step RA preambles for small data transmission at the second parameter, and the starting point of 2-step RA preambles for small data transmission at the second parameter plus fifth parameter plus the ninth parameter (or at the ninth parameter plus one plus the fifth parameter). The example is shown in FIG. 28.

Example 3f

The UE may identify (or interpret) the starting point of 4-step RA preambles for small data transmission at the second parameter plus fifth parameter plus the tenth parameter (or at the tenth parameter plus one plus the fifth parameter), and the starting point of 2-step RA preambles for small data transmission at the second parameter.

Example 4: 4-Step RA Without Small Data, and 4-Step RA with Small Data

In one example, there may be configurations of 4-step RA without small data, and 4-step RA with small data on a BWP. And the two types of RA share the same RO(s). The UE may identify (or interpret) the starting point of 4-step RA preambles for small data transmission at the second parameter.

Example 5: 4-Step RA Without Small Data, and 2-Step RA with Small Data

In one example, there may be configurations of 4-step RA without small data, and 2-step RA with small data on a BWP. And the two types of RA share the same RO(s). The UE may identify (or interpret) the starting point of 2-step RA preambles for small data transmission at the second parameter.

Example 6: 4-Step RA Without Small Data, 4-Step RA with Small Data, and 2-Step RA with Small Data In one example, there may be configurations of 4-step RA without small data, 4-step RA with small data, and 2-step RA with small data on a BWP. And the three types of RA share the same RO(s).

Example 6a

Figure 29:
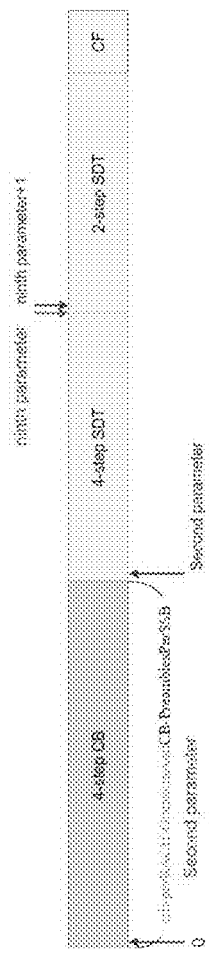
FIG. 29 illustrates example 6a of RA preamble partition for SDT with shared RO(s) according to one exemplary embodiment.

The UE may identify (or interpret) the starting point of 4-step RA preambles for small data transmission at the second parameter, and the starting point of 2-step RA preambles for small data transmission at the second parameter plus the ninth parameter (or at the ninth parameter plus one). The example is shown in FIG. 29.

Example 6b

The UE may identify (or interpret) the starting point of 4-step RA preambles for small data transmission at the second parameter plus the tenth parameter (or at the tenth parameter plus one), and the starting point of 2-step RA preambles for small data transmission at the second parameter.

The UE may initiate a 4-step RA to transmit small data when (or in response to) the upper layer indicates a small data transmission and the radio condition is below a threshold (e.g. rsrp-Threshold-msgA). The UE may initiate a 2-step RA to transmit small data when (or in response to) the upper layer indicates a small data transmission and radio condition is above a threshold (e.g. rsrp-Threshold-msgA).

The UE may receive some configurations related to RA resources for small data transmission provided by the NW. For example, the RA configurations may include some parameters to indicate the preambles for 4-step and/or 2-step small data transmission. For example, the RA configurations may include some parameters and/or occasions to indicate whether the different types of RA share the same RO(s). The RA configurations may be provided in system information, RRC signaling, and/or MAC CE.

The above method(s) to identify (or interpret) the starting point of RA preambles for a specific RA type could be applied by a UE and/or a network node. Since the UE and the NW should have common understanding on the RA preamble partitions corresponding to different RA types, the UE and the NW should apply the same method to identify (or interpret) the RA preamble partitions based on the RA configuration(s) provided by the NW (on a BWP).

The RA types may be categorized by whether it is for 2-step RA or 4-step RA, and/or whether it is for SDT (i.e. small data transmission). The RA type for SDT may be the RA procedure with small data. The RA type for SDT may be the small data transmission using RA. The RA type for SDT may be a RA type initiated in RRC_INACTIVE state. The RA type for SDT may be the RA procedure in RRC_INACTIVE state to transmit UL user data (from DRB or data channel).

The RA types may be (or comprise, or include):
RA type of 4-step RA for SDT
  The RA type may be equivalent to the RA type of 4-step SDT (or 4-step RA with small data). The RA type may be a 4-step RA procedure with small data. The small data may be uplink data (from DRB or data channel) transmitted in RRC_INACTIVE state.
RA type of 2-step RA for SDT
  The RA type may be equivalent to the RA type of 2-step SDT (or 2-step RA with small data). The RA type may be a 2-step RA procedure with small data. The small data may be uplink data (from DRB or data channel) transmitted in RRC_INACTIVE state.
RA type of 4-step not for SDT
  The RA type may be equivalent to the RA type of normal 4-step (or 4-step RA without small data, 4-step RA non-SDT). The RA type may be a legacy 4-step RA procedure. The RA type may be a 4-step RA procedure without small data. The small data may be uplink data (from DRB or data channel) transmitted in RRC_INACTIVE state.
RA type of 2-step not for SDT
  The RA type may be equivalent to the RA type of normal 2-step (or 2-step RA without small data, 2-step RA non-SDT). The RA type may be a legacy 2-step RA procedure. The RA type may be a 2-step RA procedure without small data. The small data may be uplink data (from DRB or data channel) transmitted in RRC_INACTIVE state.

Figure 30:
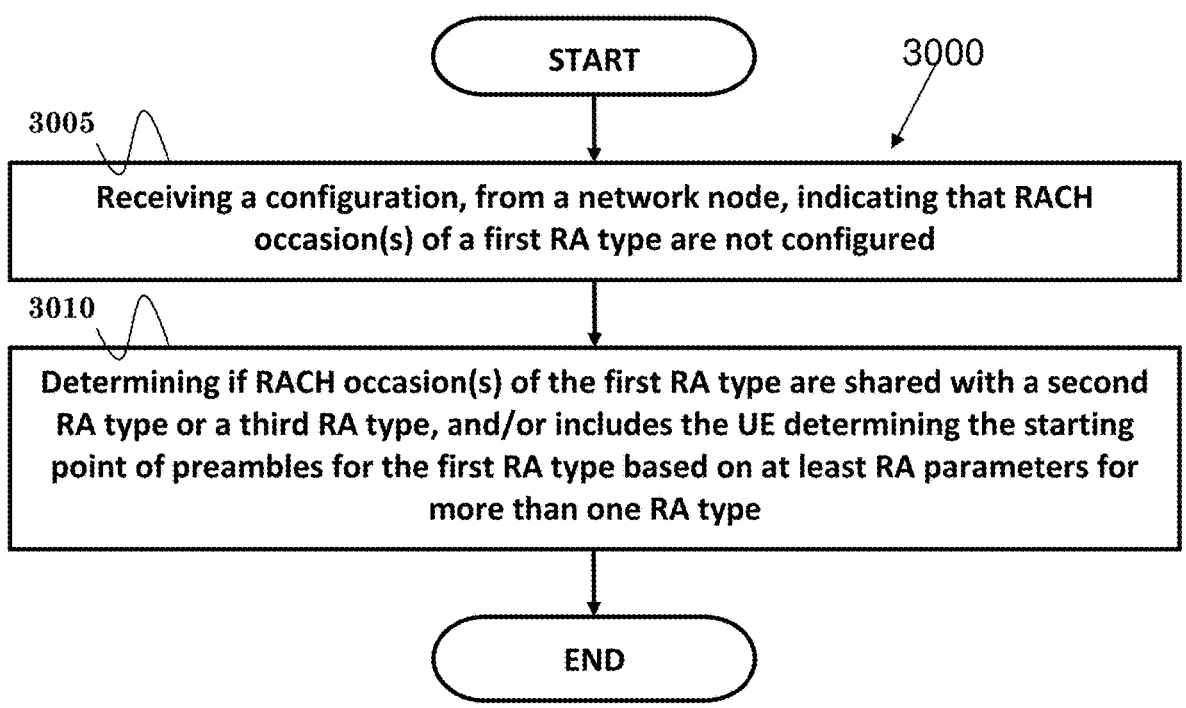
FIG. 30 is a flow chart according to one exemplary embodiment.

FIG. 30 is a flow chart 3000 according to one exemplary embodiment from the perspective of a UE. In step 3005, the UE receives a configuration, from a network node, indicating that Random Access Channel (RACH) occasion(s) of a first Random Access (RA) type are not configured. In step 3010, the UE determines if RACH occasion(s) of the first RA type are shared with a second RA type or a third RA type.

In one embodiment, the UE could determine if RACH occasion(s) (RO(s)) of the first RA type are shared with a second RA type or a third RA type based on a parameter (or indication) indicating that first RA type uses (or shares) RO(s) of the second RA type or the third RA type. The UE could also determine if RO(s) of the first RA type are shared with a second RA type or a third RA type based on a predefined rule. The predefined rule may comprise: (i) the first RA type does not use (or share) RO(s) of the second RA type; and (ii) the first RA type uses (or shares) RO(s) of the third RA type.

In one embodiment, the first, the second, or the third RA type may be 4-step RA without small data, 2-step RA without small data, 4-step with small data, or 2-step with small data. The small data may be uplink data transmitted in RRC_INACTIVE state.

Referring back to FIGS. 3 and 4, in one exemplary embodiment of a UE. The UE 300 includes a program code 312 stored in the memory 310. The CPU 308 could execute program code 312 to enable the UE (i) to receive a configuration, from a network node, indicating that RACH occasion(s) of a first RA type are not configured, and (ii) to determine if RACH occasion(s) of the first RA type are shared with a second RA type or a third RA type. Furthermore, the CPU 308 can execute the program code 312 to perform all of the above-described actions and steps or others described herein.

Figure 31:
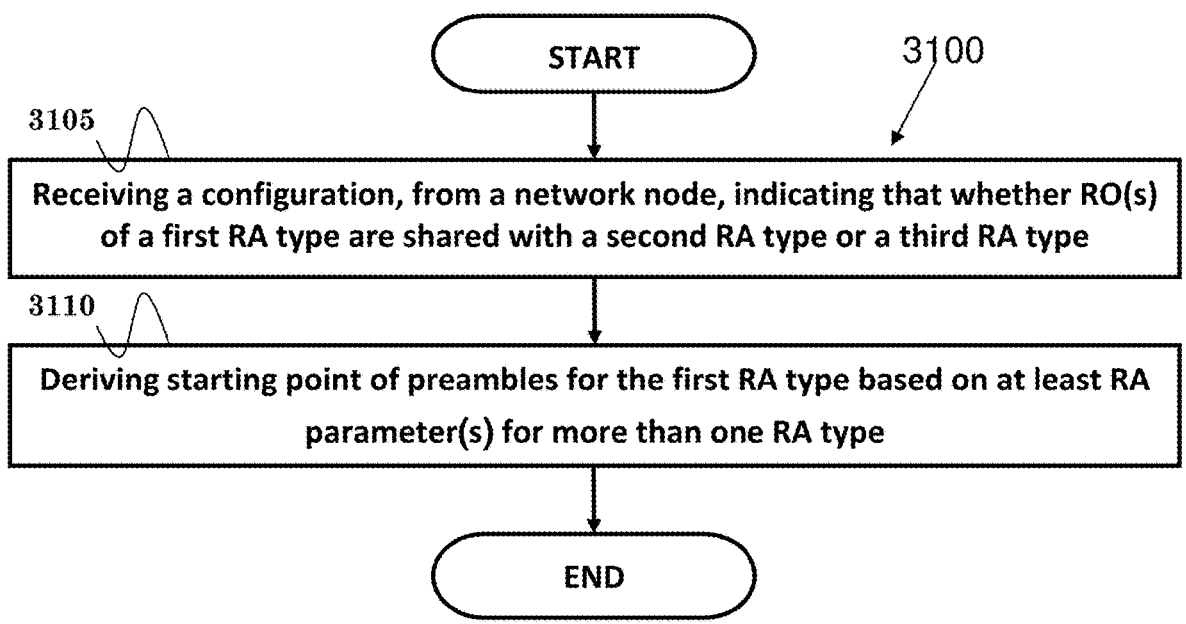
FIG. 31 is a flow chart according to one exemplary embodiment.

FIG. 31 is a flow chart 3100 according to one exemplary embodiment from the perspective of a UE. In step 3105, the UE receiving a configuration indicating that Random Access Channel (RACH) occasion(s) of a first Random Access (RA) type are shared with at least a second RA type and a third RA type. In step 3110, the UE derives starting point of preambles for the first RA type based on at least RA parameter(s) for more than one RA type.

In one embodiment, the starting point of preambles for the first RA type may be summation of preamble ranges of the more than one RA type. The preamble ranges of the more than one RA type may be provided in the configuration.

In one embodiment, the UE could select a RA preamble from the preambles for the first RA type, and could transmit the RA preamble.

In one embodiment, the first, the second, or the third RA type may be 4-step RA without small data, 2-step RA without small data, 4-step with small data, or 2-step with small data. The small data may be uplink data transmitted in RRC_INACTIVE state.

Referring back to FIGS. 3 and 4, in one exemplary embodiment of a UE. The UE 300 includes a program code 312 stored in the memory 310. The CPU 308 could execute program code 312 to enable the UE (i) to receive a configuration indicating that RACH occasion(s) of a first RA type are shared with at least a second RA type and a third RA type, and (ii) to derive starting point of preambles for the first RA type based on at least RA parameter(s) for more than one RA type. Furthermore, the CPU 308 can execute the program code 312 to perform all of the above-described actions and steps or others described herein.

Figure 32:
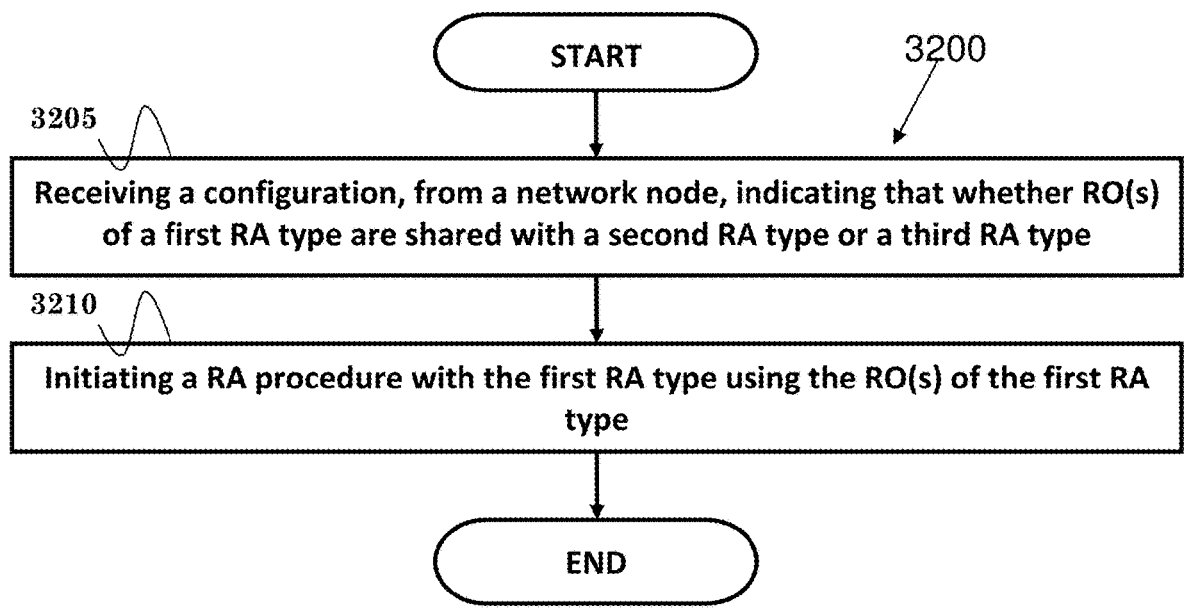
FIG. 32 is a flow chart according to one exemplary embodiment.

FIG. 32 is a flow chart 3200 according to one exemplary embodiment from the perspective of a UE. In step 3205, the UE receives a configuration, from a network node, indicating that whether RO(s) of a first RA type are shared with a second RA type or a third RA type. In step 3210, the UE initiates a RA procedure with the first RA type using the RO(s) of the first RA type.

Referring back to FIGS. 3 and 4, in one exemplary embodiment of a UE. The UE 300 includes a program code 312 stored in the memory 310. The CPU 308 could execute program code 312 (*i*) to receive a configuration, from a network node, indicating that whether RO(s) of a first RA type are shared with a second RA type or a third RA type, and (ii) to initiate a RA procedure with the first RA type using the RO(s) of the first RA type. Furthermore, the CPU 308 can execute the program code 312 to perform all of the above-described actions and steps or others described herein.

Figure 33:
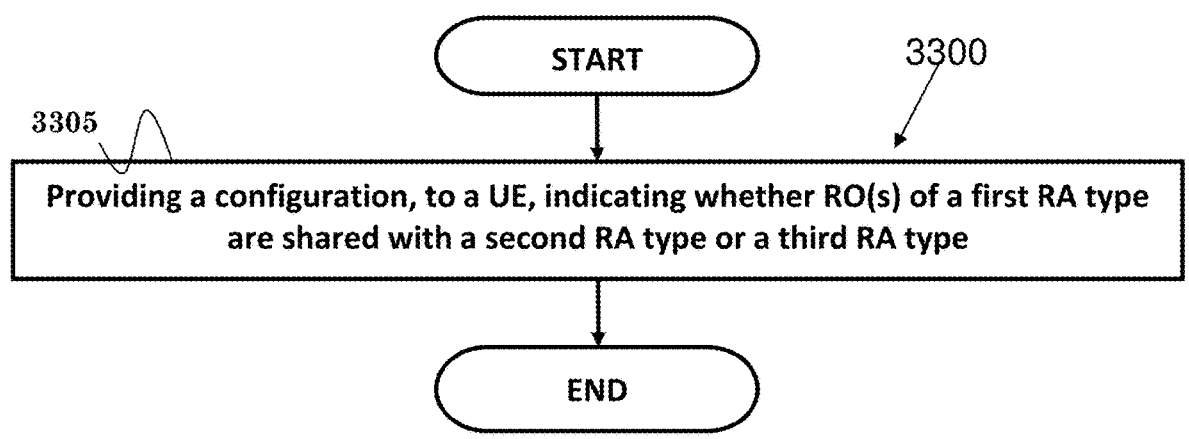
FIG. 33 is a flow chart according to one exemplary embodiment.

FIG. 33 is a flow chart 3300 according to one exemplary embodiment from the perspective of a network (NW). In step 3305, the network provides a configuration, to a UE, indicating whether RO(s) of a first RA type are shared with a second RA type or a third RA type.

Referring back to FIGS. 3 and 4, in one exemplary embodiment of a network. The network 300 includes a program code 312 stored in the memory 310. The CPU 308 could execute program code 312 to provide a configuration, to a UE, indicating whether RO(s) of a first RA type are shared with a second RA type or a third RA type. Furthermore, the CPU 308 can execute the program code 312 to perform all of the above-described actions and steps or others described herein.

In the context of the embodiments shown in FIGS. 32 and 33 and discussed above, the configuration may be an explicit configuration in one embodiment. The configuration may include a parameter (or an indication) indicating that whether RO(s) of the first RA type are shared with the second RA type or the third RA type. The parameter (or the indication) may indicate that RO(s) of the first RA type uses (or shares) RO(s) of the second RA type or the third RA type by a specific parameter. The parameter (or the indication) may be present (or provided or received) if the first RA type does not have its own RO configuration(s). On the other hand, the parameter (or the indication) may be absent (or not provided or not received) if the first RA type has its own RO configuration(s). The parameter (or the indication) may be configured in the RRC configurations of the first RA type, the second RA type and/or the third RA type. The parameter (or the indication) may be a Boolean, an enumerated, and/or an integer.

In one embodiment, the configuration may be an implicit configuration. The configuration may indicate the first RA type uses (or shares) RO(s) of the second or the third RA type by the presence or absence of one or more specific parameters, configurations, and/or information elements. The configuration may indicate the first RA type uses (or shares) RO(s) of the second or the third RA type by which parameter, configuration, and/or information element includes the RO configuration(s) of the first RA type. The configuration may indicate the first RA type uses (or shares) RO(s) of the second or the third RA type by configuring the RO configuration(s) of the first RA type in different information elements and/or in (or at) different parameters in an information element. The parameter (or the indication) may be provided in a RRC message. The RRC message may be a common signaling, a dedicated signaling, system information, dedicated RRC message, RRC reconfiguration message, and/or handover command.

In one embodiment, the UE may be a NR device and/or a NR-light device. The UE may be a reduced capability device and/or a stationary device. The UE may be a mobile phone, a wearable device, and/or a sensor. The UE may have mobility capability, or no mobility capability.

Figure 34:
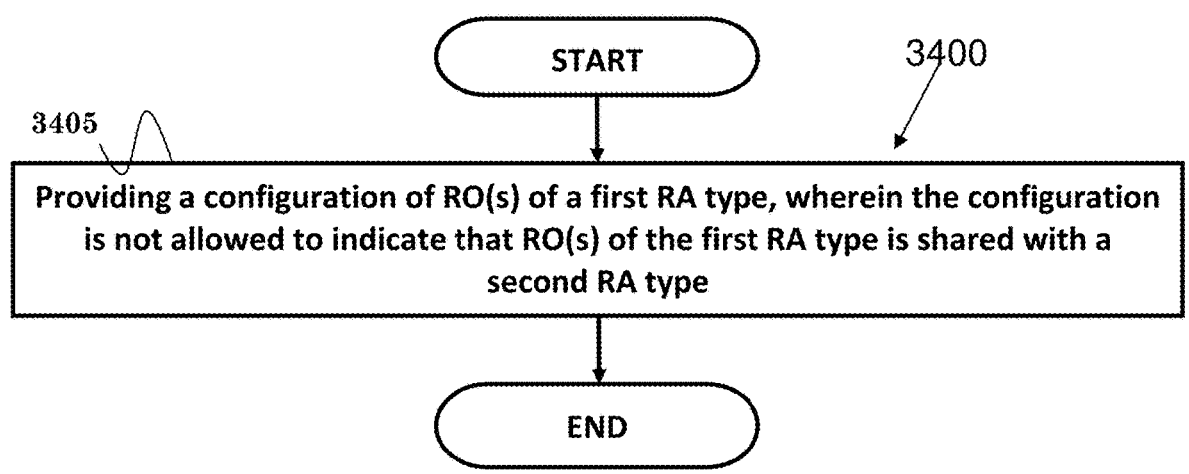
FIG. 34 is a flow chart according to one exemplary embodiment.

FIG. 34 is a flow chart 3400 according to one exemplary embodiment from the perspective of a network (NW). In step 3405, the network provides a configuration of RO(s) of a first RA type, wherein the configuration is not allowed to indicate that RO(s) of the first RA type are shared with a second RA type.

In one embodiment, the configuration may be allowed to indicate that RO(s) of the first RA type are shared with a third RA type. The first RA type may be unable to directly share the RO(s) with more than one RA type (e.g. the second or third RA type). The first RA type may be (or may include) 2-step RA for small data transmission, or 4-step RA for small data transmission. The second RA type may be (or may include) 4-step RA without small data transmission, 2-step RA without small data transmission, 4-step RA with small data transmission, or 2-step RA with small data transmission. The third RA type may be (or may include) 4-step RA without small data transmission, 2-step RA without small data transmission, 4-step RA with small data transmission, or 2-step RA with small data transmission. In one embodiment, the second and/or third RA type may be different from the first RA type.

In one embodiment, the small data transmission may be initiated upon the upper layer indicates a RRC resume procedure for small data transmission. The small data transmission may also be initiated upon the upper layer requests the resume of a suspended RRC connection for transmitting small data in RRC_INACTIVE state.

In one embodiment, the RO(s) of a RA type other than the first RA type may be shared by the first RA type when the first RA type does not have its own RO configuration(s). The RO(s) of a RA type other than the first RA type may be shared by the first RA type when the RO(s) of the first RA type are not configured. The RO configuration(s) of a RA type may be included in an information element and/or a group of parameters. The RO(s) may be shared when the NW configures the same PRACH resources for more than one RA type. The RO(s) may be shared when the PRACH resources are not enough for more than one RA type. The RO(s) may be shared when the NW supposes separated PRACH resources for more than one RA type to be unnecessary. The NW may be a network node, a base station, an access point, an eNB, and/or a gNB.

Referring back to FIGS. 3 and 4, in one exemplary embodiment of a network. The network 300 includes a program code 312 stored in the memory 310. The CPU 308 could execute program code 312 to enable the UE to provide a configuration of RO(s) of a first RA type, wherein the configuration is not allowed to indicate that RO(s) of the first RA type is shared with a second RA type. Furthermore, the CPU 308 can execute the program code 312 to perform all of the above-described actions and steps or others described herein.

Figure 35:
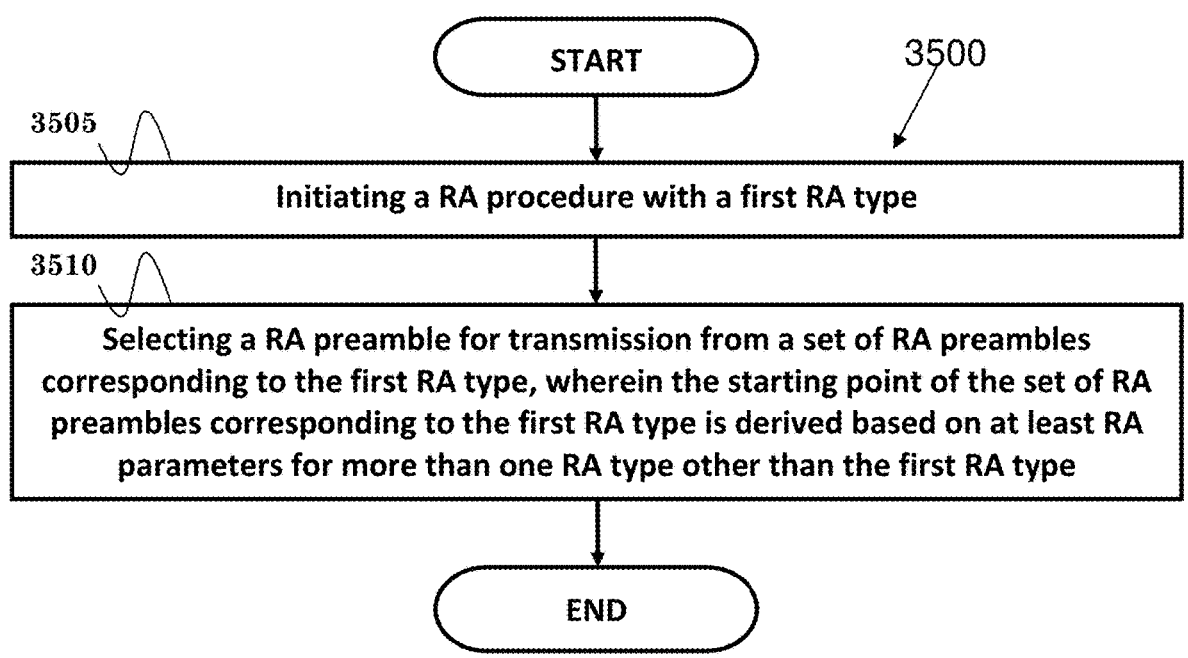
FIG. 35 is a flow chart according to one exemplary embodiment.

FIG. 35 is a flow chart 3500 according to one exemplary embodiment from the perspective of a UE. In step 3505, the UE initiates a RA procedure with a first RA type. In step 3510, the UE selects a RA preamble for transmission from a set of RA preambles corresponding to the first RA type, wherein the starting point of the set of RA preambles corresponding to the first RA type is derived based on RA parameters for more than one RA type other than the first RA type.

In one embodiment, the first RA type may be 4-step and/or 2-step RA for small data transmission. The first RA type (e.g. a first RA type) could share RO(s) with the at least a RA type other than the first RA type. The at least a RA type other than the first type may be 4-step RA without small data, 2-step RA without small data, 4-step RA with small data, and/or 2-step RA with small data.

In one embodiment, the RA procedure for the RA type may be contention-based. The small data transmission could be initiated upon the upper layer indicates a RRC resume procedure for small data transmission. The small data transmission could be initiated upon the upper layer requests the resume of a suspended RRC connection for transmitting small data in RRC_INACTIVE state.

In one embodiment, the RO(s) may be shared with other RA types when the NW configures the same PRACH resources for more than one RA type, when the PRACH resources are not enough for more than one RA type, and/or when the NW supposes separated PRACH resources for more than one RA type to be unnecessary. The RA parameters for 4-step RA without small data may be a first parameter and/or a second parameter to determine the RA preambles for 4-step CBRA and CFRA. The RA parameters for 2-step RA without small data may be a third parameter, a fourth parameter, and/or a fifth parameter to determine the RA preambles for 2-step CBRA and CFRA. The RA parameters for RA with small data may be a ninth parameter and/or a tenth parameter to determine the RA preambles for 4-step and 2-step RA.

In one embodiment, the first parameter, second parameter, third parameter, fourth parameter, and/or fifth parameter may indicate the number of preambles for the RA types. The ninth parameter and/or tenth parameter may indicate the number of preambles for the RA types, and/or the last preamble number for the RA types. The RA parameters and RO(s) may be provided by the NW in RA configurations.

In one embodiment, the starting point of 4-step RA preambles for small data transmission with shared RO(s) may be at the second parameter plus the fifth parameter plus the tenth parameter, at the second parameter plus the tenth parameter, or at the tenth parameter plus one. The starting point of 2-step RA preambles for small data transmission with shared RO(s) may be at the second parameter plus the fifth parameter, at the second parameter plus the fifth parameter plus the ninth parameter, at the second parameter plus the ninth parameter, or at the ninth parameter plus one.

In one embodiment, the UE could transmit the RA preamble during the RA procedure. The RA preamble could identify that the RA procedure is with the first RA type.

Referring back to FIGS. 3 and 4, in one exemplary embodiment of a UE. The UE 300 includes a program code 312 stored in the memory 310. The CPU 308 could execute program code 312 (i) to receive a configuration, from a network node, indicating that whether RO(s) of a first RA type are shared with a second RA type or a third RA type, and (ii) to initiate a RA procedure with the first RA type using the RO(s) of the first RA type. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a User Equipment (UE), comprising:
   receiving, from a network node, a configuration of a 2-step random access (RA);
   receiving, from the network node, a second parameter indicating a starting preamble and a third parameter indicating a number of preambles;
   initiating a RA procedure for a 2-step RA for small data;
   determining a RA preamble for the RA procedure based on the second parameter and the third parameter; and
   determining Random Access Channel (RACH) occasion(s) for the RA procedure based on whether a first parameter is present or absent in the configuration of the 2-step RA, wherein:
      the RACH occasion(s) for the RA procedure shares RACH occasion(s) for the 2-step RA in case the first parameter is present in the configuration of the 2-step RA, and
      the RACH occasion(s) for the RA procedure shares RACH occasion(s) for a 4-step RA in case the first parameter is absent in the configuration of the 2-step RA.

2. The method of claim 1, wherein the small data is uplink data transmitted in RRC_INACTIVE state.

3. The method of claim 1, wherein the 2-type RA for small data is not configured with separate RACH occasion(s).

4. The method of claim 1, further comprising:
   determining the RACH occasion(s) for a 4-step RA for small data which shares the RACH occasion(s) for the 4-step RA, wherein the RACH occasion(s) for the 4-step RA for small data does not share the RACH occasion(s) for the 2-step RA.

5. A User Equipment (UE), comprising:
   a processor; and
   a memory operatively coupled to the processor, wherein the processor is configured to execute a program code stored in the memory to:
      receive, from a network node, a configuration of a 2-step random access (RA);
      receive, from the network node, a second parameter indicating a starting preamble and a third parameter indicating a number of preambles;
      initiate a RA procedure for a 2-step RA for small data;
      determine a RA preamble for the RA procedure based on the second parameter and the third parameter; and
      determine Random Access Channel (RACH) occasion(s) for the RA procedure based on whether a first parameter is present or absent in the configuration of the 2-step RA, wherein:
         the RACH occasion(s) for the RA procedure shares RACH occasion(s) for the 2-step RA in case the first parameter is present in the configuration of the 2-step RA, and the RACH occasion(s) for the RA procedure shares the RACH occasion(s) for a 4-step RA in case the first parameter is absent in the configuration of the 2-step RA.

6. The UE of claim 5, wherein the small data is uplink data transmitted in RRC_INACTIVE state.

7. The UE of claim 5, wherein the 2-step RA for small data is not configured with separate RACH occasion(s).

8. The UE of claim 5, wherein the processor is further configured to execute a program code stored in the memory to:

determine the RACH occasion(s) for a 4-step RA for small data which shares the RACH occasion(s) for the 4-step RA, wherein the RACH occasion(s) for the 4-step RA for small data does not share the RACH occasion(s) for the 2-step RA.

\* \* \* \* \*